US012239589B2

(12) United States Patent
Galer et al.

(10) Patent No.: US 12,239,589 B2
(45) Date of Patent: *Mar. 4, 2025

(54) MATTRESS COVER AND MATTRESS ASSEMBLY

(71) Applicant: Stryker Corporation, Kalamazoo, MI (US)

(72) Inventors: James K. Galer, Byron Center, MI (US); Carrie Klain, St. Charles, IL (US); Patrick Lafleche, Kalamazoo, MI (US); Justin Raymond, Jackson, MI (US); Kevin M. Patmore, Plainwell, MI (US); Alexey Titov, Redmond, WA (US); Henry Kuhnen, Mount Pleasant, SC (US); Ming Chen, Ann Arbor, MI (US)

(73) Assignee: Stryker Corporation, Portage, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,637

(22) Filed: Jun. 7, 2023

(65) Prior Publication Data

US 2023/0310237 A1 Oct. 5, 2023

Related U.S. Application Data

(63) Continuation of application No. 17/500,262, filed on Oct. 13, 2021, now Pat. No. 11,712,383, which is a (Continued)

(51) Int. Cl.

*A61G 7/00* (2006.01)
*A47C 27/00* (2006.01)

(Continued)

(52) U.S. Cl.

CPC ............ *A61G 7/001* (2013.01); *A47C 27/003* (2013.01); *A61G 7/05769* (2013.01); *A61G 13/009* (2013.01)

(58) Field of Classification Search

CPC .... A61G 7/001; A61G 7/008; A61G 7/05769; A61G 13/009; A61G 13/04;

(Continued)

(56) References Cited

U.S. PATENT DOCUMENTS

| | | | | |
|---|---|---|---|---|
| 1,926,500 A * | 9/1933 | Sackner | ................ | A47C 27/04 428/397 |
| 3,254,348 A | 6/1966 | Addario | | |

(Continued)

FOREIGN PATENT DOCUMENTS

| | | | |
|---|---|---|---|
| CN | 2251310 Y | | 4/1997 |
| GB | 2151472 A | * | 10/1984 |

(Continued)

OTHER PUBLICATIONS

Direct Healthcare Services Ltd., "Dyna-Form Low Air Loss System User Manual", Version 01, Mar. 1, 2013, 16 pages.

(Continued)

*Primary Examiner* — George Sun

(74) *Attorney, Agent, or Firm* — Howard & Howard Attorneys PLLC

(57) ABSTRACT

A mattress cover for a mattress providing movement therapy to a patient. A patient support portion covers the upper surface of the mattress, and a bottom portion is coupled to the patient support portion. The mattress cover may substantially encase the mattress. An augmenting feature is associated with a peripheral portion with the augmenting feature adapted to move between a stored configuration, and a deployed configuration in response to increasing thickness of the mattress during the movement therapy. The augmenting feature may include concertinaed material, such as thermoformed plastic, and/or a fold of material coupled to the peripheral portion. The patient support portion and the bottom portion may at least partially overlap and be move- (Continued)

able relative to one another. The mattress cover may be included on a mattress overlay having a patient turning device, or on the mattress supported on a patient support apparatus.

22 Claims, 16 Drawing Sheets

Related U.S. Application Data continuation of application No. 16/220,589, filed on Dec. 14, 2018, now Pat. No. 11,173,085.

(60) Provisional application No. 62/611,207, filed on Dec. 28, 2017.

(51) Int. Cl.
*A61G 7/057* (2006.01)
*A61G 13/00* (2006.01)

(58) Field of Classification Search
CPC ... A47C 27/002; A47C 27/003; A47C 21/022; A47G 9/0246
See application file for complete search history.

(56) References Cited

U.S. PATENT DOCUMENTS

| | | | | |
|---|---|---|---|---|
| 3,940,811 | A | 3/1976 | Tomikawa et al. | |
| 4,336,621 | A | 6/1982 | Schwartz et al. | |
| 4,605,582 | A | 8/1986 | Sias et al. | |
| 4,665,573 | A | 5/1987 | Fiore | |
| 4,718,133 | A * | 1/1988 | DiMatteo | A61G 5/1002<br>5/81.1 C |
| 4,941,221 | A * | 7/1990 | Kanzler | A47C 20/048<br>5/607 |
| 4,947,500 | A | 8/1990 | Seiler | |
| 5,007,124 | A | 4/1991 | Raburn et al. | |
| 5,109,559 | A | 5/1992 | West | |
| 5,148,560 | A | 9/1992 | Torres | |
| 5,179,742 | A | 1/1993 | Oberle | |
| 5,180,619 | A | 1/1993 | Landi et al. | |
| 5,224,228 | A * | 7/1993 | Larrimore | A61G 7/001<br>5/942 |
| 5,280,657 | A | 1/1994 | Stagg | |
| 5,482,355 | A | 1/1996 | Franzen, Jr. | |
| 5,491,854 | A | 2/1996 | Music | |
| 5,526,543 | A * | 6/1996 | DiMatteo | A61G 7/001<br>5/660 |
| 5,611,096 | A | 3/1997 | Bartlett et al. | |
| 5,617,595 | A | 4/1997 | Landi et al. | |
| 5,630,238 | A | 5/1997 | Weismiller et al. | |
| 5,794,289 | A | 8/1998 | Wortman et al. | |
| 6,115,861 | A | 9/2000 | Reeder et al. | |
| 6,145,143 | A * | 11/2000 | Hicks | A61G 7/05784<br>5/691 |
| 6,154,900 | A * | 12/2000 | Shaw | A61G 7/001<br>5/81.1 R |
| 6,269,504 | B1 | 8/2001 | Romano et al. | |
| 6,286,166 | B1 | 9/2001 | Henley et al. | |
| 6,367,106 | B1 | 4/2002 | Gronsman | |
| 6,370,716 | B1 * | 4/2002 | Wilkinson | A61G 5/1043<br>297/452.41 |
| 6,387,065 | B1 | 5/2002 | Tumey | |
| 6,430,766 | B1 | 8/2002 | Henley et al. | |
| 6,658,676 | B1 | 12/2003 | Persson et al. | |
| 6,687,937 | B2 | 2/2004 | Harker | |
| 6,701,556 | B2 | 3/2004 | Romano et al. | |
| 6,701,558 | B2 | 3/2004 | VanSteenburg | |
| 6,718,584 | B2 | 4/2004 | Rabaiotti et al. | |
| 6,735,799 | B1 | 5/2004 | Ellis et al. | |
| 6,829,796 | B2 | 12/2004 | Salvatini et al. | |
| 7,060,213 | B2 | 6/2006 | Pearce | |
| 7,191,480 | B2 | 3/2007 | Romano et al. | |
| 7,191,482 | B2 | 3/2007 | Romano et al. | |
| 7,461,425 | B2 | 12/2008 | Chambers et al. | |
| 7,464,425 | B2 | 12/2008 | Chambers et al. | |
| 7,469,432 | B2 | 12/2008 | Chambers | |
| 7,469,436 | B2 | 12/2008 | Meyer et al. | |
| 7,480,953 | B2 | 1/2009 | Romano et al. | |
| 7,617,555 | B2 | 11/2009 | Romano et al. | |
| 7,641,623 | B2 | 1/2010 | Biondo et al. | |
| 7,648,392 | B2 | 1/2010 | Chambers et al. | |
| 7,666,341 | B2 | 2/2010 | Pearce | |
| 7,685,664 | B2 | 3/2010 | Stolpmann et al. | |
| 7,712,164 | B2 | 5/2010 | Chambers | |
| 7,712,171 | B2 | 5/2010 | Butler | |
| 7,802,332 | B2 | 9/2010 | Kummer et al. | |
| 7,886,386 | B2 | 2/2011 | Balonick et al. | |
| 7,904,976 | B2 | 3/2011 | Hakamiun et al. | |
| 7,914,611 | B2 | 3/2011 | Vrzalik et al. | |
| 7,966,680 | B2 | 6/2011 | Romano et al. | |
| 8,069,514 | B2 | 12/2011 | Poulos et al. | |
| 8,090,478 | B2 | 1/2012 | Skinner et al. | |
| 8,108,957 | B2 | 2/2012 | Richards et al. | |
| 8,117,701 | B2 | 2/2012 | Bobey et al. | |
| 8,118,920 | B2 | 2/2012 | Vrzalik et al. | |
| 8,196,241 | B2 | 6/2012 | Balonick et al. | |
| 8,201,292 | B2 | 6/2012 | Dionne et al. | |
| 8,235,922 | B2 | 8/2012 | Rowe et al. | |
| 8,260,475 | B2 | 9/2012 | Receveur | |
| 8,332,979 | B2 | 12/2012 | Flick et al. | |
| 8,372,182 | B2 | 2/2013 | Vrzalik et al. | |
| 8,397,326 | B2 | 3/2013 | Afleche et al. | |
| 8,429,778 | B2 | 4/2013 | Receveur et al. | |
| 8,434,748 | B1 | 5/2013 | Pearce et al. | |
| 8,437,876 | B2 | 5/2013 | Receveur et al. | |
| 8,490,233 | B2 | 7/2013 | Essers | |
| 8,572,778 | B2 | 11/2013 | Newkirk et al. | |
| 8,601,620 | B2 | 12/2013 | Romano et al. | |
| 8,620,477 | B2 | 12/2013 | Skinner et al. | |
| 8,628,067 | B2 | 1/2014 | Pearce et al. | |
| 8,689,373 | B2 | 4/2014 | Caines | |
| 8,712,591 | B2 | 4/2014 | Receveur | |
| 8,745,788 | B2 | 6/2014 | Bhai | |
| 8,844,079 | B2 | 9/2014 | Skinner et al. | |
| 8,845,562 | B2 | 9/2014 | Receveur et al. | |
| 8,918,930 | B2 | 12/2014 | Stroh et al. | |
| 8,919,750 | B2 | 12/2014 | Pearce et al. | |
| 9,009,891 | B2 | 4/2015 | Receveur et al. | |
| 9,009,892 | B2 | 4/2015 | Lachenbruch et al. | |
| 9,049,943 | B2 | 6/2015 | Caminade et al. | |
| 9,107,511 | B2 | 8/2015 | Skinner et al. | |
| 9,254,231 | B2 | 2/2016 | Vrzalik et al. | |
| 9,315,648 | B2 | 4/2016 | Nilson et al. | |
| 9,320,664 | B2 | 4/2016 | Newkirk et al. | |
| 9,358,168 | B2 | 6/2016 | Williamson et al. | |
| 9,414,977 | B2 | 8/2016 | Ponsi et al. | |
| 9,462,893 | B2 | 10/2016 | Romano et al. | |
| 9,526,348 | B2 | 12/2016 | Richards et al. | |
| 9,526,349 | B2 | 12/2016 | Lafleche et al. | |
| 9,655,457 | B2 | 5/2017 | Meyer et al. | |
| 9,707,141 | B2 | 7/2017 | Bobey et al. | |
| 9,707,142 | B2 * | 7/2017 | Lachenbruch | A61G 7/001 |
| 9,835,344 | B2 | 12/2017 | Vrzalik et al. | |
| 9,849,051 | B2 | 12/2017 | Newkirk et al. | |
| 9,907,408 | B2 | 3/2018 | Vrzalik et al. | |
| 9,907,718 | B2 | 3/2018 | Weitzel et al. | |
| 9,913,770 | B2 | 3/2018 | Lachenbruch et al. | |
| 9,943,172 | B2 | 4/2018 | Lachenbruch et al. | |
| 10,405,671 | B2 | 9/2019 | Emile | |
| 11,173,085 | B2 | 11/2021 | Galer et al. | |
| 2005/0183202 | A1 * | 8/2005 | Diaz | A47C 31/001<br>5/737 |
| 2005/0217030 | A1 * | 10/2005 | Seigler | A47C 27/003<br>5/738 |
| 2006/0005314 | A1 * | 1/2006 | Lee | A47G 9/1081<br>5/644 |
| 2007/0143928 | A1 * | 6/2007 | Biggie | A61G 7/0525<br>5/713 |
| 2008/0040860 | A1 | 2/2008 | Price et al. | |
| 2009/0013470 | A1 | 1/2009 | Richards et al. | |

(56) References Cited

U.S. PATENT DOCUMENTS

| | | | | |
|---|---|---|---|---|
| 2010/0076356 | A1 | 3/2010 | Biondo et al. | |
| 2010/0212087 | A1 | 8/2010 | Leib et al. | |
| 2011/0163885 | A1 | 7/2011 | Poulos et al. | |
| 2013/0014324 | A1 | 1/2013 | Receveur et al. | |
| 2013/0231596 | A1 | 9/2013 | Hornbach et al. | |
| 2014/0031730 | A1 | 1/2014 | Hornbach et al. | |
| 2015/0074914 | A1 | 3/2015 | Caminade | |
| 2015/0164720 | A1 | 6/2015 | Gibson et al. | |
| 2016/0157631 | A1 | 6/2016 | Milnes et al. | |
| 2016/0184154 | A1 | 6/2016 | Lafleche et al. | |
| 2016/0326674 | A1 | 11/2016 | Goijarts et al. | |
| 2016/0331611 | A1* | 11/2016 | Ponsi | A61G 7/0509 |
| 2016/0356676 | A1 | 12/2016 | Sauser et al. | |
| 2016/0361215 | A1 | 12/2016 | Gibson et al. | |
| 2017/0027791 | A1 | 2/2017 | McKnight et al. | |
| 2017/0151113 | A1 | 6/2017 | Lachenbruch et al. | |
| 2017/0164695 | A1* | 6/2017 | Davis | A47C 27/003 |
| 2017/0251824 | A1 | 9/2017 | Pearce | |
| 2017/0251825 | A1 | 9/2017 | Pearce | |
| 2017/0254379 | A1 | 9/2017 | Whatcott | |
| 2018/0104123 | A1 | 4/2018 | Newkirk et al. | |
| 2018/0325761 | A1* | 11/2018 | Shih | A47C 27/10 |
| 2018/0369038 | A1 | 12/2018 | Bhimavarapu et al. | |
| 2019/0183252 | A1 | 6/2019 | Liu | |
| 2019/0201261 | A1 | 7/2019 | Galer et al. | |
| 2022/0031541 | A1 | 2/2022 | Galer et al. | |

FOREIGN PATENT DOCUMENTS

| | | | |
|---|---|---|---|
| GB | 2405582 | A | 3/2005 |
| WO | 9507679 | A2 | 3/1995 |
| WO | 02065877 | A1 | 8/2002 |
| WO | 2013086197 | A1 | 6/2013 |

OTHER PUBLICATIONS

Drive, "Med Aire Plus 8" Alternating Pressure and Low Air Loss Mattress Replacement System Operator's Manual, Item #14029, Control Unit 14029XP), Rev. 4, Mar. 15, 2016, 20 pages.

English language abstract and machine-assisted English translation for CN 2251310 extracted from espacenet.com database on Feb. 15, 2019, 5 pages.

Gaymar Industries Inc., "Air Express Alternating Low Pressure Therapy Operator's Manual", Apr. 2012, 113 pages.

Gaymar Industries Inc., "Air Express C1000DF Service Manual", Jul. 2007, 16 pages.

Gaymar Industries Inc., "Air Express Lal P1500 Low Air Loss Therapy System Operator's Manual", Rev. B, Apr. 2010, 32 pages.

Gaymar Industries Inc., "Aire Twin Alternating Pressure and Low-Loss Therapy Mattress Replacement Systems ATC80, ATM500, ATM800, ATW5000, ATW8000 Operator's Manual", May 2005, 8 pages.

Gaymar Industries Inc., "Auto Aire Select Dynamic Low-Air Loss Therapy Service Manual", Rev. A, Apr. 2010, 28 pages.

Gaymar Industries Inc., Auto Aire Select Dynamic Low-Air Loss Therapy With Alternating Pressure and Active Sensor Technology Ref C2500MES Control Unit, Ref M2500S Series Mattress, Ref X3580S Operator's Manual Rev. B, Sep. 2010, 42 pages.

Gaymar Industries Inc., "Auto Aire Select Dynamic Low-Air Loss Therapy With Alternating Pressure and Active Sensor Technology Ref C2500MS Control Unit, Ref M2500S Series Mattress, Ref Auto Aire Select Safety Mattress Service Manual", Rev. B, Sep. 2010, 14 pages.

Gaymar Industries Inc., "Auto Sure-Float Ref C1000MS/C1000MES Control Unit; Ref M1001S/M1002S Series Mattress Operator's Manual", Rev. B, Sep. 2010, 128 pages.

Gaymar Industries Inc., "Clini-Dyne Lateral Rotation System CLP2000 Control Unit, CLM Series Mattress Service Manual", Rev. A, Oct. 2010, 18 pages.

Gaymar Industries Inc., "Clini-Dyne Rotational Therapy System CLP2000 Control Unit, CLM Series Mattress Operator's Manual", Rev. A, Oct. 2010, 8 pages.

Gaymar Industries Inc., "EFF302 Alternating Pad Instructions", Rev. A, Jan. 2010, 1 page.

Gaymar Industries Inc., "Instructions for Use Sof Care Mattress Series", Rev. A, May 2010, 12 pages.

Gaymar Industries Inc., "O2 Zoned Multi-Functional Portable Rotation System P4000, P4001, C4000 Series Control Unit, M4000 Series Mattress Operator's Manual", Rev. B, Oct. 2010, 12 pages.

Gaymar Industries Inc., "Paradise Pump PAR 30 Config F Alternating Pressure Pump Functional Check Instructions", Rev. A, Apr. 2007, 1 page.

Gaymar Industries Inc., "Paradise Pump Series Operator's Manual", Sep. 2005, 8 pages.

Gaymar Industries Inc., "Plexus O2 Zoned Multi-Functional Portable Rotation System C4000 Series Control Unit, M4000 or M4001 Series Mattress Service Manual", Rev. A, Oct. 2010, 40 pages.

Gaymar Industries Inc., "Plexus Ref P102 Plexus Jr. Alternating Pressure System, Ref C102 Plexus Jr. APM Control Unit, Ref M100 Alternating Pressure Mattress Overlay Instructions for Use", Rev. C, Apr. 2012, 20 pages.

Gaymar Industries Inc., "Pressure Pedic Pressure Redistribution Mattress Instructions for Use", Rev. B, Dec. 2009, 2 pages.

Gaymar Industries Inc., "SC505 Sof Care Inflator Operating Instructions and Service Manual", Rev. C, Oct. 2010, 8 pages.

Gaymar Industries Inc., "Sof Care Bed Cushions Instructions for Use", Sep. 1993, 2 pages.

Gaymar Industries Inc., "Sof Matt Low Air Loss Mattress System Operator's Manual/Service Manual", Oct. 2010, 40 pages.

Gaymar Industries Inc., "Symmetric Aire Mattress Ref SYM3000 Series Instructions for Use", Apr. 2012, 3 pages.

Gaymar Industries, "Symmetric Aire Mattress Ref SYM3000 Series Service Document", Rev. A, Jun. 2010, 2 pages.

Hill-Rom, "300 Wound Surface Prevention and Treatment Surfaces Brochure", Rev. 2, May 18, 2010, 2 pages.

Hill-Rom, "Hill-Rom P500 Therapy Surface Product No. P005723 and P005787 User Manual", Rev. 3, 2010, 54 bages.

Hill-Rom, Synergy Air Elite Low Air Loss Therapy Brochure, Rev. 2, Dec. 30, 2008, 4 pages.

Hill-Rom, "Synergy Air Elite Low Air Loss Therapy Webpage", https://homecare.hill-rom.com/en/durable-medical-equipment/therapy-mattresses/therapy-mattresses/synergy-air-elite-low-air-loss-therapy/, 2019, 2 pages.

Invacare Corporation, "MicroAir MA90 Series-Owner's Operator and Maintenance Manual", 2008, 28 pages.

Kap Medical, "Digital Alternating Pressure True LAL System Brochure", 2013, 2 pages.

Medline, "Z-Flo Positioner/Covers by Molnlycke", http://www.medline.com/product/Z-Flo-Positioners-by-Sundance-Enterprises-Inc/Z05-PF70265, 2016, 1 page.

Molnlycke Health Care AB, "Turning and Positioning Webpage", http://molnlycke.us/products-solutions/turning-and-positioning-system/ formerly known as http://sundancesolutions.com/, 2016, 2 pages.

Plexus Medical, "O2 Zoned C4000 Portable Rotation System; CareMedx C5000 Multi-Zoned Low Air Loss Therapy System Service Manual", published at least prior to September 2018, 58 pages.

Plexus Medical, "Plexus C1000D Series Control Unit Service Manual", published at least prior to Sep. 2018, 20 pages.

Plexus Medical, "Plexus P1500 Air Express LAL System Service Manual", published at least prior to Sep. 2018, 17 pages.

Sage Products, "Pressure Injury and Safe Patient Handling Solutions—Prevalon Mobile Air Transfer Systems; Prevalon Turn & Position Systems; Prevalon Heel Protectors; Prevalon Seated Positioning System Brochure", 2017, 20 pages.

Sage Products, "Prevalon Air Pump Brochure", 2017, 1 page.

Sage Products, "Prevalon AirTap Patient Repositioning System Operator's Manual", 2016, 10 pages.

Sage Products, "Prevalon AirTap XXL Patient Repositioning System Brochure", 2018, 4 pages.

(56) References Cited

OTHER PUBLICATIONS

Sage Products, "Prevalon Standard Turn and Position System Instructions for Use", 2016, 1 page.
Sage Products, "Prevalon Turn and Position System 2.0 Instructions for Use", 2016, 1 page.
Sage Products, "Sage Product Catalog—Pressure Injury Prevention and Safe Patient Handling", 2018, 4 pages.
Stryker Medical, "Arise 1000 EX Low Air-Loss Bariatric Surface Specification Sheet", Rev. B, 2008, 2 pages.
Stryker Medical, "Arise 1000EX Low Air Loss Therapy Mattress Model 2236 Operations/Maintenance Manual", Rev. B, May 2009, 30 pages.
Stryker Medical, "ComfortGel SE Support Surface Ref 1805 Operations Manual", Rev. C, Sep. 2016, 18 pages.
Stryker Medical, "ComfortGel Support Surface Ref 2850 Operations Manual", Rev. A, Aug. 2017, 22 pages.
Stryker Medical, "ComfortGel Support Surface Specification Sheet", Rev. E.6, Dec. 2011, 2 pages.
Stryker Medical, "EOLE / EOLE DC Pump Ref 2870, Ref 2871 Service Manual", Oct. 2017, 16 pages.
Stryker Medical, "EOLE DC Powered Support Surface Ref 2871 Operations/Maintenance Manual", Dec. 2017, 288 pages.
Stryker Medical, "EOLE Powered Support Surface Ref 2870 Operations/Maintenance Manual", Dec. 2017, 288 pages.
Stryker Medical, "IsoAir Ref 2940 Service Manual", Rev. 1.0, Nov. 2016, 144 pages.
Stryker Medical, "IsoFlex LAL Support Surface Ref 2860 Operations/Maintenance Manual", Rev. C, Aug. 2017, 28 pages.
Stryker Medical, "IsoFlex LAL Support Surface Specification Sheet", Rev. D.3, 2016, 2 pages.
Stryker Medical, "IsoFlex Pressure Management Mattress Instructions for Use", Rev. A, Jun. 2010, 2 pages.
Stryker Medical, "IsoFlex SE Support Surface Ref 1806 Operations Manual", Rev. C, Sep. 2016, 20 pages.
Stryker Medical, "IsoGel AIR Support Surface Ref 2860 Operations Manual", Rev. F, May 2015, 25 pages.
Stryker Medical, "IsoGel Support Surface Dimensional Gel Technology Specification Sheet", Dec. 2013, 2 pages.
Stryker Medical, "Isolibrium Support Surface Ref 2971 Operations/Maintenance Manual", Rev. B, Oct. 2014, 202 pages.
Stryker Medical, "Isolibrium Support Surface Ref 2971 Operations/Maintenance Manual", Rev. C, May 2014, 200 pages.
Stryker Medical, "Isolibrium Support Surface Specification Sheet", Rev. E.4, Nov. 2013, 2 pages.
Stryker Medical, "Isolibrium Support Surface Version 4.0, Ref 2971, Ref 2972 Maintenance Manual", Rev. B, May 2017, 88 pages.
Stryker Medical, "Isolibrium Support Surface Version 4.0, Ref 2971, Ref 2972 Maintenance Manual", Rev. C, May 2017, 88 pages.
Stryker Medical, "Isolibrium Support Surface Version 4.0, Ref 2971, Ref 2972 Maintenance Manual", Rev. C.2, Jul. 2017, 88 pages.
Stryker Medical, "Mattress Assembly Page—2235-100-001—Bariatric Bed Model 2230", Rev. A, Nov. 2008, 2 pages.
Stryker Medical, "P100/Sof Care Pump Ref 2880, Ref 2890 Service Manual", Oct. 2017, 8 pages.
Stryker Medical, "Position Pro Therapy Mattress Model 2920 Operations/Maintenance Manual", Rev. A, Feb. 2007, 55 pages.
Stryker Medical, "PositionPro Patient Repositioning Support Surface-Standalone with Pendant or Integrated with FL27 In Touch CC Model Beds Ref 2920 Maintenance Manual", Rev. A, Oct. 2016, 56 pages.
Stryker Medical, "PositionPro Patient Repositioning Support Surface-Standalone with Pendant or Integrated with FL27 In Touch CC Model Beds Ref 2920 Maintenance Manual", Rev. G, Oct. 2016, 42 pages.
Stryker Medical, "Pressure Management—Dynamic Mattress System 2500 Operations/Maintenance Manual", published at least prior to Sep. 2018, 17 pages.
Stryker Medical, "Pressure Management—Dynamic Mattress System 2500 Operations/Maintenance Manual", published at least prior to Sep. 2018, 23 pages.
Stryker Medical, "ProForm Non-Powered Support Surface Model 2710 Operations/Maintenance Manual", Rev. G, Sep. 14, 2015, 134 pages.
Stryker Medical, "Save Simply Brochure", 2018, 2 pages.
Stryker Medical, "Sof Care Chair Cushion Ref 2770-100-000 Operations Manual", Rev. D, Apr. 2016, 1 page.
Stryker Medical, "Sof Care DuoGard Overlay Brochure", 2015, 3 pages.
Stryker Medical, "SofCare Healthcare Boot, Ref 2760-100-000, Ref 2760-200-000, Ref 2760-300-000 Operations Manual", Rev. C, Mar. 2016, 2 pages.
Stryker Medical, "SofCare HeelCare Boot Series Specification Sheet", Rev. B.3, Aug. 2011, 2 pages.
Stryker Medical, SofCare Stretcher Overlay Ref 2780-400-000, Ref 2780-500-000 Operations Manual, Rev. B, Dec. 2014, 2 pages.
Stryker Medical, "SPR Plus Low Air Loss Overlay 3-Layer Technology Specification Sheet", Rev. D.2, Aug. 2011, 2 pages.
Stryker Medical, "SPR Plus Overlay Ref 2790-100-000 Operations Manual", Rev. B, Dec. 2014, 2 pages.
Stryker Medical, "Stryker Air I, Stryker Air II Low Air Loss Therapy Mattress (LAL), Model 2236 Operations/Maintenance Manual", Rev. B, May 2009, 30 pages.
Stryker Medical, "Stryker Air Pump REF 2861 Operation/Maintenance Manual", Rev. 2.0, Jun. 2016, 24 pages.
Stryker Medical, "Stryker Air Pump Ref 2861 Service Manual", Rev. 2.0, Jun. 2016, 58 pages.
Stryker Medical, "Stryker IsoAir REF 2940" Operation/Maintenance Manual, Rev. 4.00, Dec. 2015, 52 pages.
Stryker Medical, "Ultra Comfort SE Support Surface Ref. 1703; Ref. 1704 Operations Manual", Rev. D, May 2017, 40 pages.
Stryker Medical, "XPRT Pulmonary Therapy & Wound Care Mattress Model 2950 Operations/Maintenance Manual", Rev. C, Aug. 2007, 114 pages.
Stryker Medical, "XPRT Therapeutic Support Surface Ref 2950 Operations/Maintenance Manual", Rev. B, Jun. 2012, 468 pages.
Stryker Medical, XPRT Therapy Mattress Model 2950 Operations Manual, Rev. A, Jul. 2006, 98 pages.
Stryker Medical, "XPRT Therapy Mattress Model 2950 Operations/Maintenance Manual", Rev. A, May 2006, 98 pages.
Stryker Medical, "XPRT Therapy Mattress Model 2950 Operations/Maintenance Manual", Rev. H, Jun. 2006, 98 pages.
Stryker Medical, "DuoGard Overlay Ref 2780-300-000 Operations Manual", Rev. B, Dec. 2014, 1 page.
The Scenic Life, "Review: Sleep Number AirFit Adjustable Pillow with CoolFit Foam", Mar. 9, 2012, https://web. archive.org/web/20150419050756/http://thesceniclife.com/2012/03/09/review-sleep-number-airfit-adjustable-pillow-coolfit-foam/, 4 pages.

* cited by examiner

MATTRESS COVER AND MATTRESS ASSEMBLY

CROSS-REFERENCE TO RELATED APPLICATIONS

The subject patent application is a Continuation of U.S. patent application Ser. No. 17/500,262 filed on Oct. 13, 2021, which is a Continuation of U.S. patent application Ser. No. 16/220,589 filed on Dec. 14, 2018 and issued as U.S. Pat. No. 11,173,085 on Nov. 16, 2021, which claims priority to and all the benefits of U.S. Provisional Patent Application No. 62/611,207 filed on Dec. 28, 2017, the disclosures of each of which are hereby incorporated by reference in their entirety.

BACKGROUND

Prolonged bed rest without adequate mobilization is often associated with increased risk of pulmonary complications, including hypoxia, atelectasis, and hospital-acquired infections such as ventilator-associated pneumonia. For patients too weak or unstable to be sufficiently mobilized during critical phases of acute illness, treatment has included medical personnel (e.g., nurses) manually turning the patient from side to side for fixed intervals of time, often termed "lateral rotation therapy" (LRT). Manually manipulating the patient supported on a patient support apparatus above a floor surface is associated with risk to the patient and caregivers alike.

The advent of integrating LRT with the patient support apparatus improved pulmonary outcomes and also facilitated prevention of skin-related complications. Early manifestations of integrated LRT included articulating a frame of the patient support apparatus to correspondingly rotate the patient from side to side. More recently, inflatable bladders have been provided within the mattress with the bladders inflatable in a coordinated manner to rotate the patient from side to side. With a mattress cover coupled to the mattress, it is appreciated that increasing the volume of the mattress (and/or the volume within the mattress cover secured to the mattress) requires a corresponding increase in surface area of the mattress cover. In other words, the mattress cover must expand or otherwise provide slack to prevent the cover from impeding the expanding volume of the mattress during the LRT or patient turning operation. The problem is particularly pronounced at the sides of the mattress and mattress cover.

Many known mattress covers are fraught with shortcomings. Solely forming the mattress cover from elastic material (s) is insufficient for most applications. The elastic materials often expand by 25-50%, whereas LRT often requires expansion of the mattress cover by greater than 100%. For another example, systems independent to the mattress cover having mechanisms to permit expansion and force retraction of the mattress cover are complex, expensive, and unsatisfactory.

Furthermore, the shape of the upper surface of the mattress cover is also altered during LRT. Effectuating the patient turning operation in which one portion of the mattress is expanded (e.g., the upper surface of the mattress cover is urged upwardly) may result in a generally concave or arcuate contour of the upper surface of the mattress cover supporting the patient. Often, the altered shape results in excess slack or wrinkles on the upper surface of the mattress cover (despite the paradoxical benefit of excess slack at the sides of the mattress cover). The wrinkles are potential points or areas of increased pressure with risk of pressure ulcers, irritation and discomfort to the patient.

Therefore, a need exists in the art for a mattress cover for a mattress providing rotation therapy to the patient supported on the patient support apparatus that overcomes one or more of the aforementioned disadvantages.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
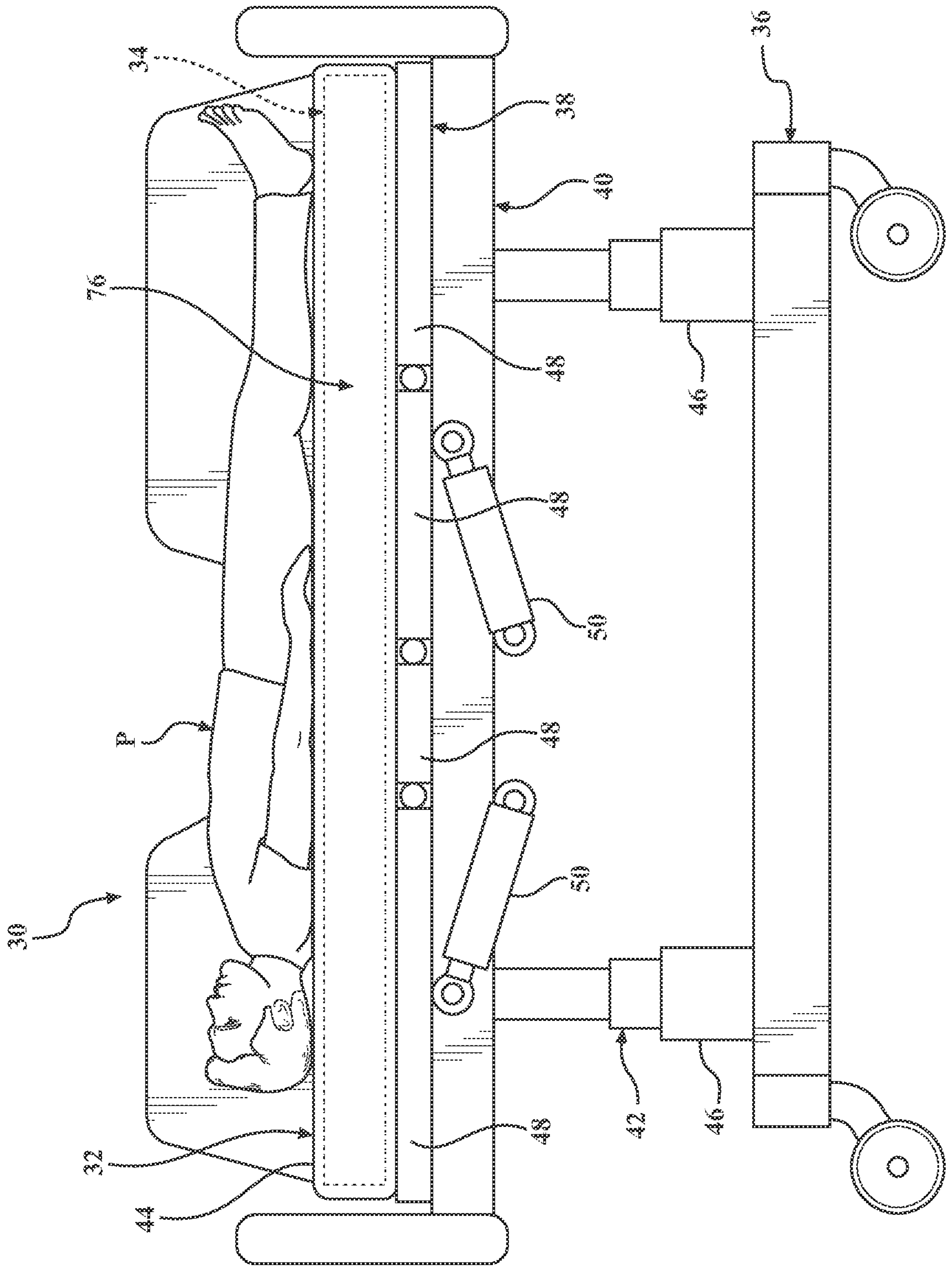
FIG. 1 is an elevation view of a mattress cover in accordance with an exemplary embodiment of the present disclosure with the mattress cover coupled to a mattress providing rotation therapy to a patient supported on a patient support apparatus.

FIG. 1 illustrates a patient support apparatus 30 including a mattress cover 32 in accordance with an exemplary embodiment of the present disclosure. The mattress cover 32 is adapted to be coupled to a mattress 34 providing movement therapy to be described with a patient P supported thereon. The patient support apparatus 30 shown in FIG. 1 is a hospital bed, but alternatively may be a stretcher, cot, trolley, gurney, wheelchair, recliner, chair, table, or suitable support or transport apparatus.

The patient support apparatus 30 may include a base 36 adapted to rest upon a floor surface, and a patient support deck 38 coupled to the base 36. In certain embodiments, an intermediate frame 40 is spaced above the base 36 with the patient support deck 38 coupled to or disposed on the intermediate frame 40. A lift device 42 may be operably coupled to the intermediate frame 40 and the base 36 for moving a patient support portion 44 to be described relative to the base 36. In the exemplary embodiment illustrated in FIG. 1, the lift device 42 includes a pair of linear actuators 46, but other suitable constructions are contemplated.

In certain embodiments, the patient support deck 38 includes articulating sections 48 configured to articulate the patient support portion 44 between various configurations. The articulating sections 48 may include a fowler, a seat section, a thigh section, a leg section, and the like, movably coupled to actuators 50. For example, the fowler may be moved between a first position in which the patient P is supine, as illustrated in FIG. 1, and a second position in which the torso of the patient P is positioned at an incline. For another example, a gatch maneuver may be performed in which the position(s) of the thigh and leg sections are adjusted. In the aforementioned examples, the shape of the mattress 34 (and/or the mattress cover 32) may be altered, and it is understood that the advantageous features of the mattress cover 32 to be described in the context of lateral rotation therapy may be applied to therapies involving movement of the articulating sections 48. It is also understood that in other examples, the patient support deck 38 may be rigid and unable to articulate.

Figure 2:
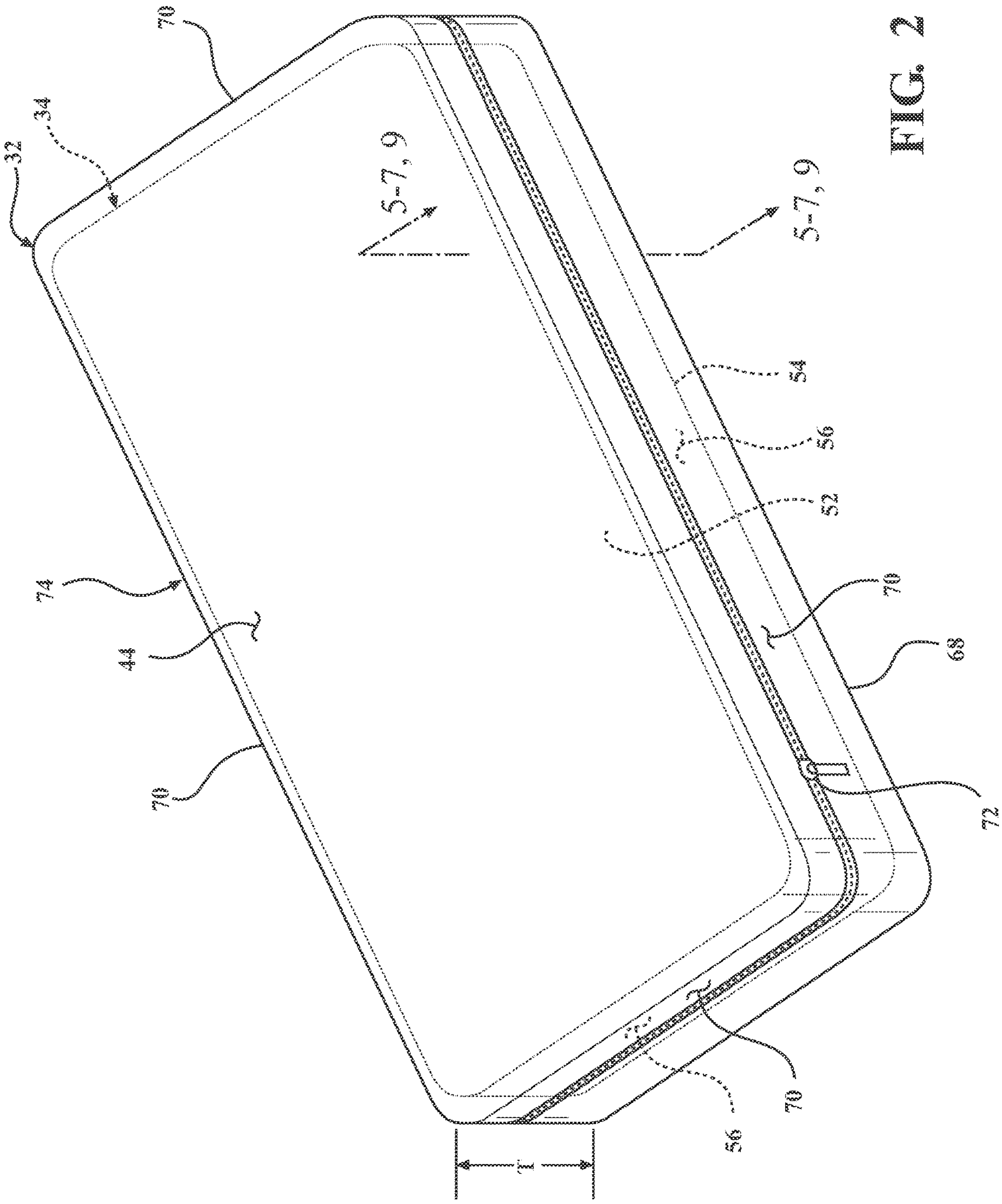
FIG. 2 is a perspective view of the mattress cover and mattress of FIG. 1.

The patient support apparatus 30 includes the mattress 34 coupled to or supported on the patient support deck 38. FIG. 2 shows the mattress 34 (in phantom) including an upper surface 52 and a lower surface 54 opposite the upper surface 52. The thickness T of the mattress 34 may be defined between the upper surface 52 and the lower surface 54. The mattress 34 includes sides 56 that may extend between the upper and lower surfaces 52, 54. In manners to be further described throughout the present disclosure, in certain embodiments providing the movement therapy includes increasing the thickness T of the mattress 34 with the patient P disposed thereon.

Figure 3:
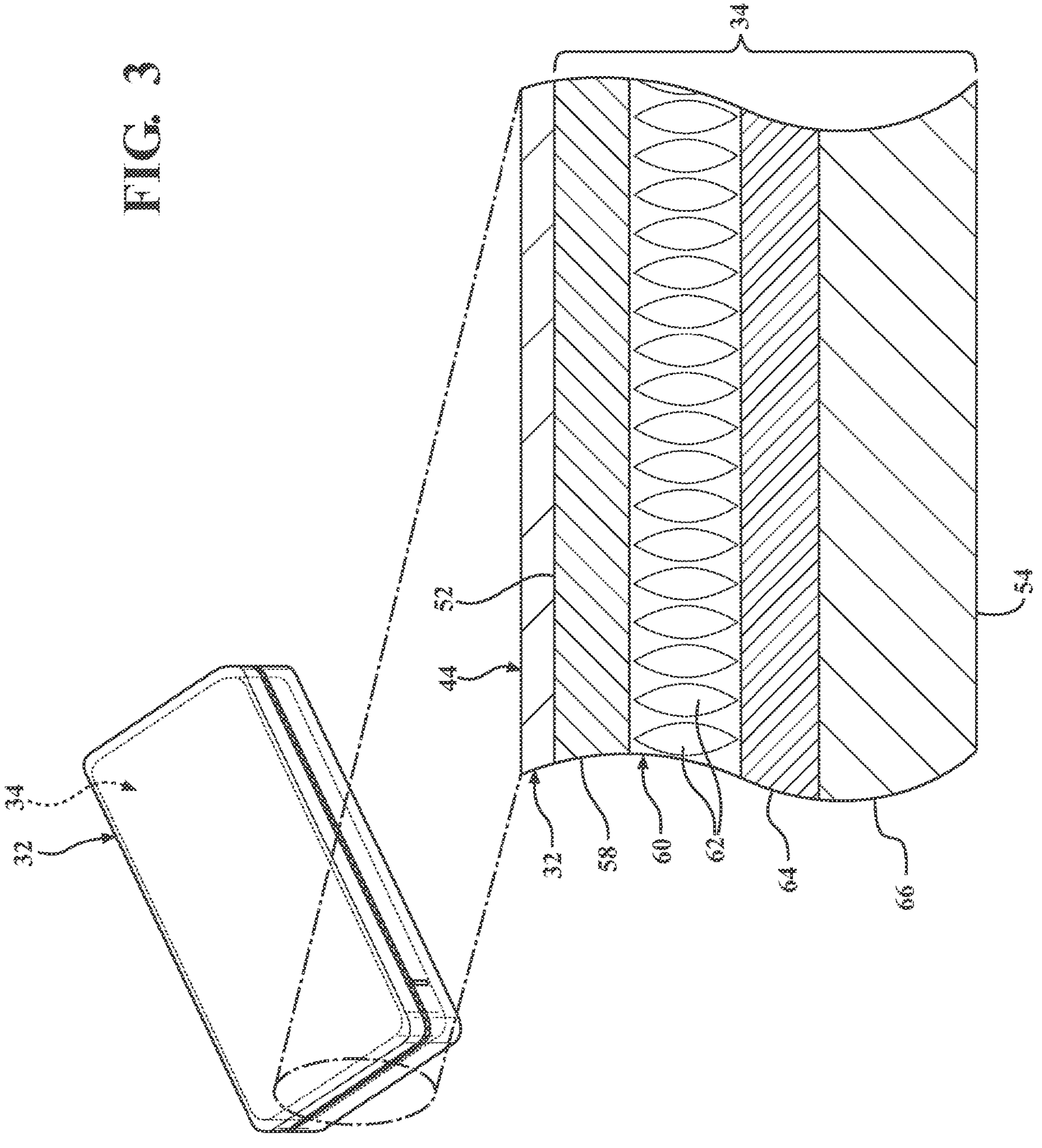
FIG. 3 is a perspective view of the mattress cover and mattress of FIG. 2 with a detailed sectional view of layers of the mattress cover and mattress in accordance with another exemplary embodiment of the present disclosure.

Referring now to FIG. 3, the upper surface 52 of the mattress 34 may be associated with an upper layer 58. In other words, the upper layer 58 defines the upper surface 52 of the mattress 34 with the mattress cover 32 in contact with the upper layer 58. The upper layer 58 may be formed primarily from polyurethane, but other suitable materials are contemplated. In another example, the upper layer 58 is formed of foam, another material, or a combination thereof.

The mattress 34 includes a patient turning device 60. The patient turning device 60 may be defined as a layer within the mattress 34 disposed intermediate the upper surface 52 and the lower surface 54, as shown in FIG. 3, or external the mattress 34 in an embodiment to be described (see FIG. 14). The patient turning device 60 may include one or more inflatable bladders 62 adapted to receive fluid from a fluid source to expand during the movement therapy (also referred to herein as a patient turning operation). The fluid from the fluid source may be a liquid, such as water, or a gas, such as air. Alternatively, it is contemplated that mechanical and/or electromechanical means may be provided in order to effectuate the movement of the mattress 34. For example, actuators (e.g., rotary actuators, linear actuators, springs, coils, and the like) may be operated by a controller to provide the movement therapy. For another example, components comprised of shape memory material(s) (e.g., Nitinol) may be coupled to the mattress 34 in a suitable manner. The shape memory material provides for a change in shape in response to application or removal of forced applied to the components with the change in shape resulting in corresponding movement of the mattress 34 to provide the movement therapy.

An inner membrane layer 64 may be provided within the mattress 34. In one example, the inner membrane layer 64 is in fluid communication with a source of air (not shown) circulated through the inner membrane layer 64 to control humidity of the mattress cover 32. In the exemplary embodiment of FIG. 3, the inner membrane layer 64 is in direct contact with the patient turning device 60. The mattress 34 further includes a mattress core layer 66 that may be disposed in direct contact with the inner membrane layer 64. The mattress core layer 66 may be formed of foam, another material, or a combination thereof. In one example, the structure of the mattress core layer 66 takes the form of honeycombs that are adapted to resiliently buckle when supporting the patient P on the upper layer 58 of the mattress 34.

In certain embodiments, the mattress 34 (or the mattress cover 32) include a fire barrier layer (not shown). The fire barrier layer may be positioned intermediate the patient turning device 60 and the inner membrane layer 64. One exemplary fire barrier layer suitable for the present application is provided under the tradename Nomex (DuPont Company, Wilmington, Dela.). A self-healing layer (not shown) may be provided and positioned, for example, in direct contact with the upper layer 58 or intermediate the upper layer 58 and the patient turning device 60. The self-healing layer may be formed from a low-durometer poured urethane with the capability of self-sealing in the event of small, inadvertent punctures from sharps (e.g., a hypodermic needle). It is to be understood that the arrangement of the specific layers of the mattress 34 is not specifically limited to those set forth above. Further, in certain embodiments the mattress 34 may include more or fewer layers. For example, the mattress 34 may not include the upper layer 58 with the mattress cover 32 in contact with one of the patient turning device 60, the inner membrane layer 64, the mattress core layer 66, and the like.

The mattress cover 32 is coupled to the mattress 34. The mattress cover 32 defines the patient support portion 44 adapted to cover the upper surface 52 of the mattress 34. Thus, absent bedding and the like, the patient P is supported by and in contact with the patient support portion 44 of the mattress cover 32. In certain embodiments, the mattress cover 32 may be coupled to the mattress 34 so as to substantially encase the mattress 34. Referring to FIG. 2, the patient support portion 44 covers the upper surface 52 of the mattress 34. The mattress cover 32 may include a bottom portion 68 coupled to the patient support portion 44 with the bottom portion 68 covering the lower surface 54 of the mattress 34. In other words, the patient support portion 44 and the bottom portion 68 may be positioned opposite the mattress 34. The mattress cover 32 may include peripheral portions 70 extending between the patient support portion 44 and the bottom portion 68. The peripheral portions 70 may be positioned adjacent to and/or adapted to cover the sides

56 of the mattress 34 as shown in FIG. 2. With the patient support portion 44, the bottom portion 68, and the peripheral portions 70 covering the respective surfaces of the mattress 34, the mattress cover 32 substantially encases the mattress 34. In other exemplary embodiments to be described, the mattress cover 32 covers the upper surface 52 of the mattress 34 (and in some instances the peripheral portions 70), but otherwise does not substantially encase the same.

In certain embodiments, the mattress cover 32 includes a fastening device 72 coupling two portions of the mattress cover 32 such that the mattress cover 32 is removably coupled to the mattress 34. FIG. 2 shows the fastening device 72 including a zipper extending about at least a portion of the peripheral portions 70 of the mattress cover 32. Other fastening devices may include snaps, clips, tethers, hook and eye connections, adhesive, and the like. In other exemplary embodiments, the patient support portion 44, the bottom portion 68, and/or the peripheral portions 70 may be integrally formed such that the mattress cover 32 is of unitary structure and not removable from the mattress 34.

Figure 4A:
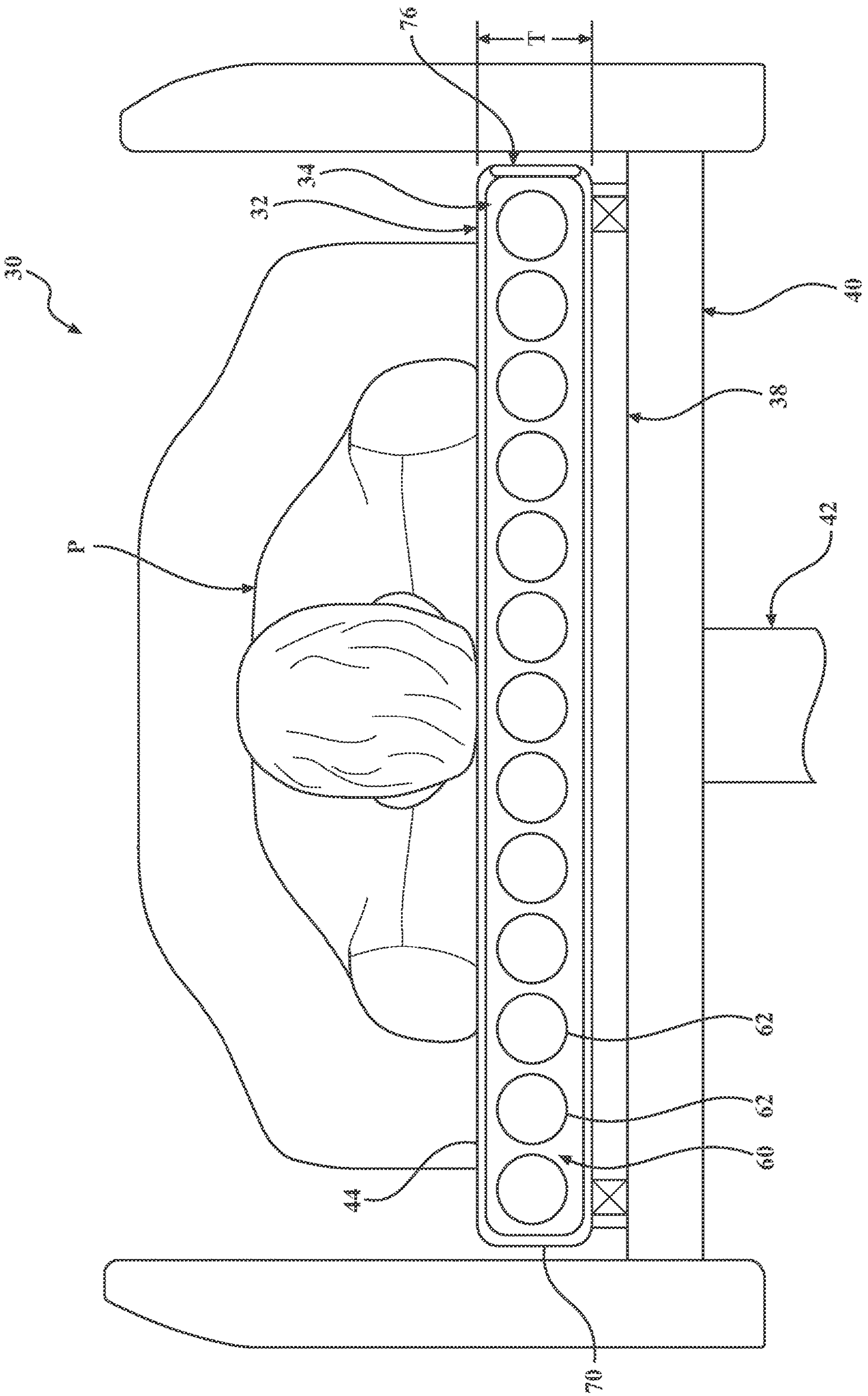
FIG. 4A is an elevation view of a portion of the patient support apparatus of FIG. 1 in the absence of movement therapy with the mattress cover including an augmenting feature represented schematically in a stored configuration.

The patient support portion 44 includes an outer periphery 74 sized so that a majority of the patient P is supported on the patient support portion 44, particularly during the movement therapy. In one example, the outer periphery 74 is defined by the edges between the patient support portion 44 and the peripheral portions 70 of the mattress cover 32. In another example, the outer periphery 74 is defined by boundaries of a predetermined area of the patient support portion 44 with the area adapted to support the patient P during the movement therapy. It is shown in FIGS. 1, 2 and 4A that the mattress cover 32 and the mattress 34 have a length and width sufficient to accommodate the patient P on the patient support portion 44. In other words, the outer periphery 74 that may define the length and width of the patient support portion 44 with the majority of the patient P positioned within the outer periphery 74.

Figure 4B:
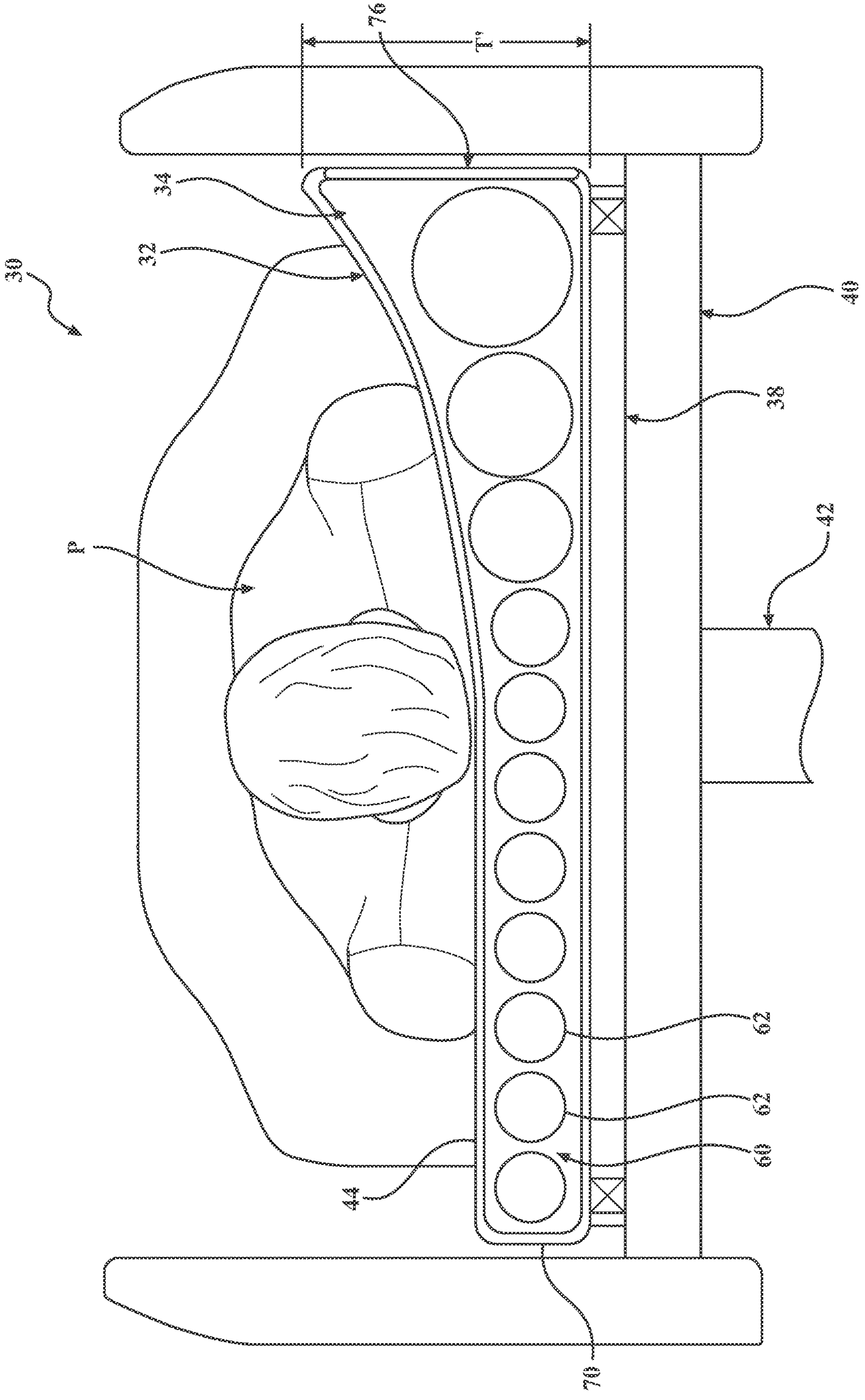
FIG. 4B is an elevation view of the portion of the patient support apparatus of FIG. 4A with the mattress providing movement therapy to the patient and the augmenting feature represented schematically in a deployed configuration.

Referring now to FIGS. 4A and 4B, an exemplary operation of the movement therapy will now be described. FIG. 4A shows the patient support apparatus 30 in the absence of movement therapy. The thickness T of the mattress 34 defined between the upper and lower surfaces 52, 54 is substantially constant across the width of the mattress 34. The resulting may be that the upper surface 52 and the patient support portion 44 of the mattress cover 32 being substantially horizontal with the patient P situated thereon in the supine position as shown. The patient turning device 60 is actuated to alter the thickness T of the mattress 34. One or more of the inflatable bladders 62 of the patient turning device 60 are selectively inflated with fluid from the fluid source (not shown). Expansion of the inflatable bladder(s) 62 increase the thickness T of the mattress 34 and the mattress cover 32 covering at least a portion of the mattress 34. FIG. 4B shows several of the inflatable bladders 62 expanded with the thickness T' of the mattress 34 being increased to define the movement therapy. The increased thickness T' of the mattress 34 turns the patient P in a corresponding manner. For example, FIG. 4B shows the patient P is turned counterclockwise with the increased thickness T' of the right side of the mattress 34. Conversely, the inflatable bladder(s) 62 may be selectively deflated, such as by an actuated valve and/or under the influence of a vacuum to decrease the thickness of the mattress 34 and the mattress cover 32. Once the increased thickness T' is decreased to the thickness T of the mattress 34, the mattress cover 32 and the mattress 34 may be considered in the absence of movement therapy.

The mattress cover 32 must expand or otherwise provide slack to prevent the mattress cover 32 from impeding increasing the thickness T of the mattress 34 (e.g., expanding of the inflatable bladders 62). The mattress cover 32 includes an augmenting feature 76 associated with one of the peripheral portions 70. The augmenting feature 76 is adapted to move between a stored configuration in the absence of the movement therapy, and a deployed configuration in response to increasing the thickness T of the mattress 34 during the movement therapy. It is to be understood that the augmenting feature 76 may include more than one augmenting feature associated with more than one of the peripheral portions 70. In one example including the mattress 34 having a conventional shape, each of four of the peripheral portions 70 may be associated with the augmenting feature 76. The augmenting feature 76 is represented schematically in FIGS. 1, 4A, 4B and 11 with specific embodiments to be described.

Figure 5:
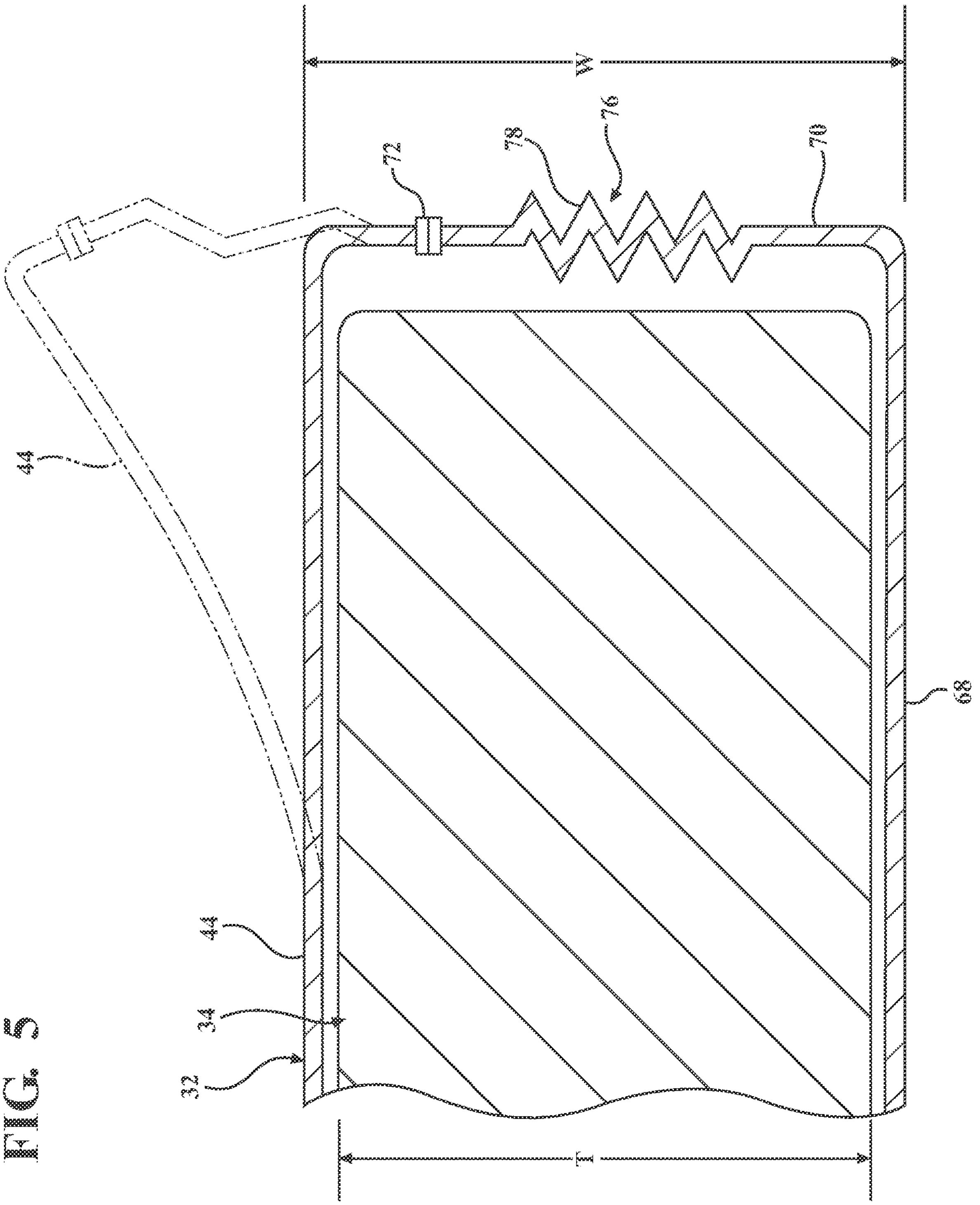
FIG. 5 is a sectional view of the mattress cover and mattress of FIG. 2 taken along section lines 5-5.

FIGS. 5-7 and 9 are sectional views of the mattress cover 32 and mattress 34 in accordance with several exemplary embodiments of the present disclosure (with internal structure(s) of the mattress 34 omitted for clarity). Referring to FIG. 5, the peripheral portion 70 includes a width W defined between the patient support portion 44 and the bottom portion 68 of the mattress cover 32. In one example, the width W of the peripheral portion 70 may be considered the thickness T of the mattress cover 32. As mentioned, the augmenting feature 76 is associated with the peripheral portion 70. The width W of the peripheral portion 70 is adapted to increase as the augmenting feature 76 moves from the stored configuration to the deployed configuration in response to increasing the thickness T of the mattress 34 during the movement therapy. In other words, the augmenting feature 76 may provide the slack to permit the mattress cover 32 to expand during the movement therapy. Likewise, the width W of the peripheral portion 70 is adapted to decrease as the augmenting feature 76 moves from the deployed configuration towards the stored configuration in response to decreasing the thickness T of the mattress 34 during the movement therapy. The augmenting feature 76 returns to the stored configuration in the absence of the movement therapy.

Figure 6:
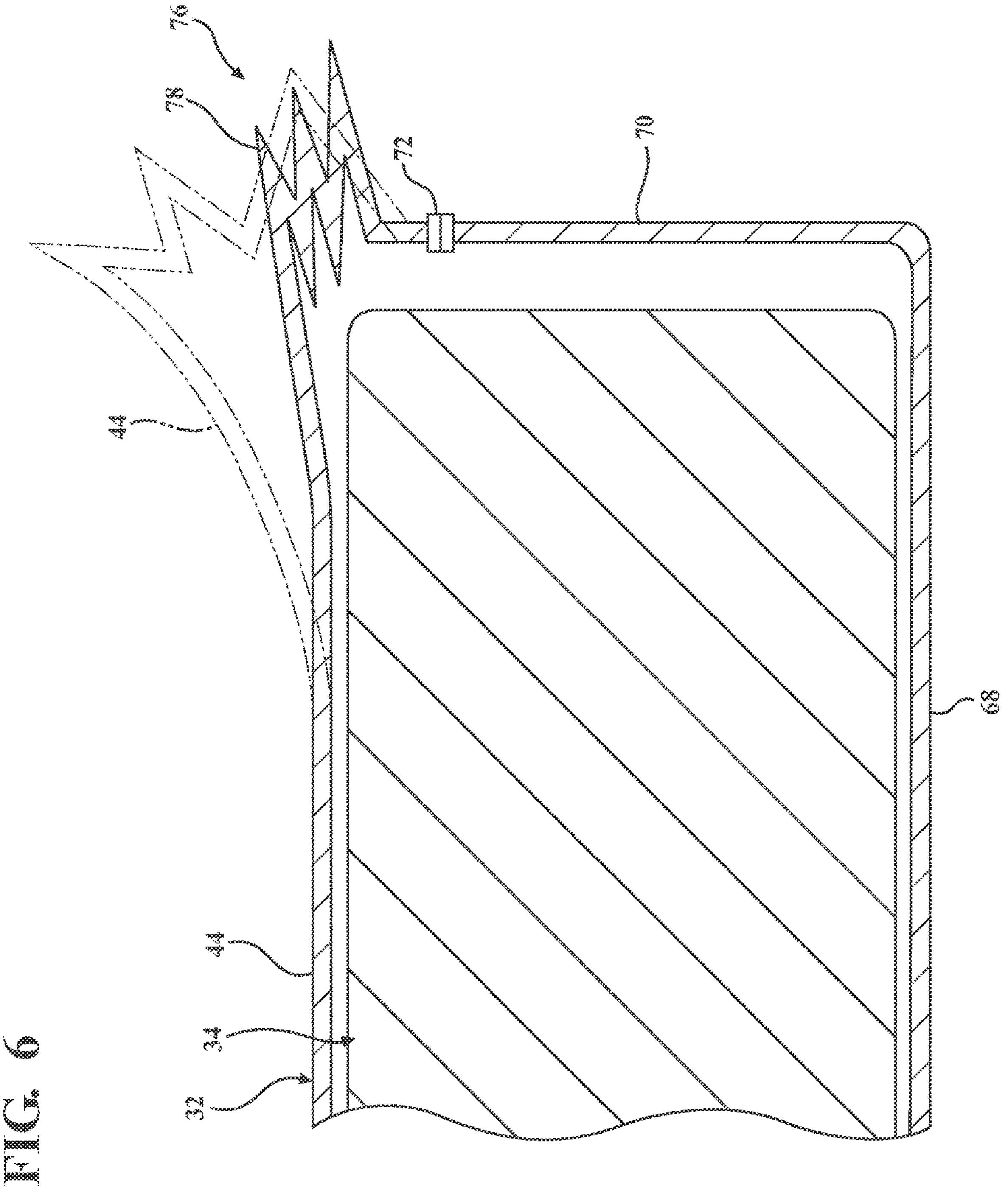
FIG. 6 is a sectional view of the mattress cover and mattress of FIG. 2 taken along section lines 6-6.
Figure 7:
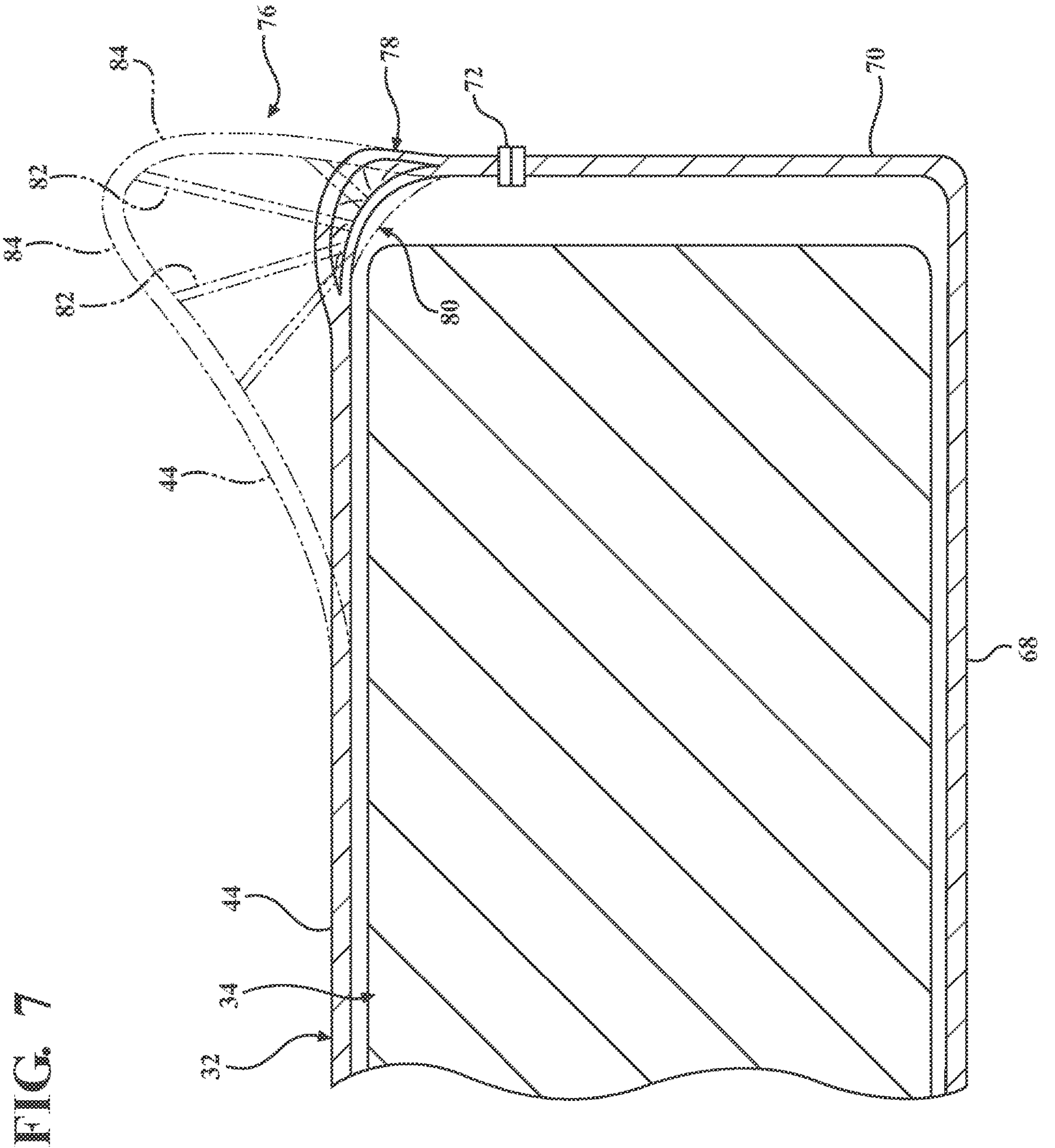
FIG. 7 is a sectional view of the mattress cover and mattress of FIG. 2 taken along section lines 7-7.

In the exemplary embodiment of FIGS. 5-7 the augmenting feature 76 includes accordion-like, bellows-like, or concertinaed material 78 coupled to the peripheral portion 70. The concertinaed material 78 is adapted to assume an expanded state when the augmenting feature 76 is in the deployed configuration, and a natural state when the augmenting feature 76 is in the stored configuration. During the movement therapy the thickness T of the mattress 34 increases (i.e., the upper surface 52 moves upwardly in the elevational view of FIG. 5), thereby providing a corresponding upward force to the patient support portion 44 of the mattress cover 32 (the mattress 34 is supported below by the patient support deck 38). The patient support portion 44 moves away from the bottom portion 68. The peripheral portion 70, which would otherwise be placed in tension and potentially impede further increase in the thickness T of the mattress 34, is provided slack by the concertinaed material 78 such that the width W of the peripheral portion 70 increases in a corresponding manner. Conversely, as the patient support portion 44 moves towards the bottom portion 68, such as during cycling of the movement therapy, the concertinaed material 78 returns to the natural state and provides for compact design of the augmenting feature 76 and the peripheral portion 70 of the mattress cover 32.

In one example, the concertinaed material 78 is fabricated from thermoformed plastic formed in the concertinaed manner illustrated in FIG. 5 in an unstressed, unflexed, or natural state. The thermoformed plastic includes some flexibility and resiliency. The thermoformed plastic is adapted to flex at the folds of the concertinaed material 78 such that the concertinaed material 78 generally straightens (i.e., moves to the expanded state) as the augmenting feature 76 moves from the stored configuration to the deployed configuration. As the augmenting feature 76 moves from the deployed configuration to the stored configuration, the resiliency of the thermoformed plastic causes the concertinaed material 78 to return from the expanded state to the natural state. In other words, in the exemplary embodiments including the concertinaed material 78, the concertinaed material 78 is in the natural state when the augmenting feature 76 is in the stored configuration, and the concertinaed material 78 is in the expanded state when the augmenting feature 76 is in the deployed configuration.

In the exemplary embodiment illustrated in FIG. 5, the concertinaed material 78 is positioned adjacent most of the width W of the peripheral portion 70. In exemplary embodiments of the augmenting feature 76 with the concertinaed material 78 shown in FIGS. 6 and 7, the concertinaed material 78 is positioned near the patient support portion 44. As mentioned, the concertinaed material 78 may be thermoformed plastic, for example, with pleats formed from radiofrequency welding. The augmenting feature 76 of FIG. 5 moves to the deployed configuration (shown in phantom) with substantially an entirety of the concertinaed material 78 remaining external to the outer periphery 74 of the patient support portion 44. In other words, in the expanded state the concertinaed material 78 may extend substantially vertically and/or parallel with the sides of the mattress 34.

With the exemplary embodiments of FIGS. 6 and 7 showing the augmenting feature 76 positioned near the patient support portion 44, a portion of the concertinaed material 78 moves inwardly (e.g., within the outer periphery 74) as the augmenting feature 76 moves from the stored configuration to the deployed configuration (shown in phantom). In FIG. 6, the concertinaed material 78 includes pleats that move between the natural state and the expanded state in the accordion-like or the bellows-like manner. In FIG. 7, the concertinaed material 78 includes a hub point 80 and spokes 82 of the material connected to the patient support portion 44 at the hub point 80. The spokes 82 articulate about the hub 80 as the concertinaed material 78 moves between the natural state and the expanded state. Outer legs 84 extend between the spokes 82 to provide aesthetics such that the mattress cover 32 appears "smooth" with the augmenting feature 76 in both the stored and deployed configurations. It is to be understood that features from the exemplary embodiments of the augmenting feature 76 shown in FIGS. 5-7 may be used in combination to provide for greater expansion of the mattress cover 32 during the movement therapy.

Figure 8:
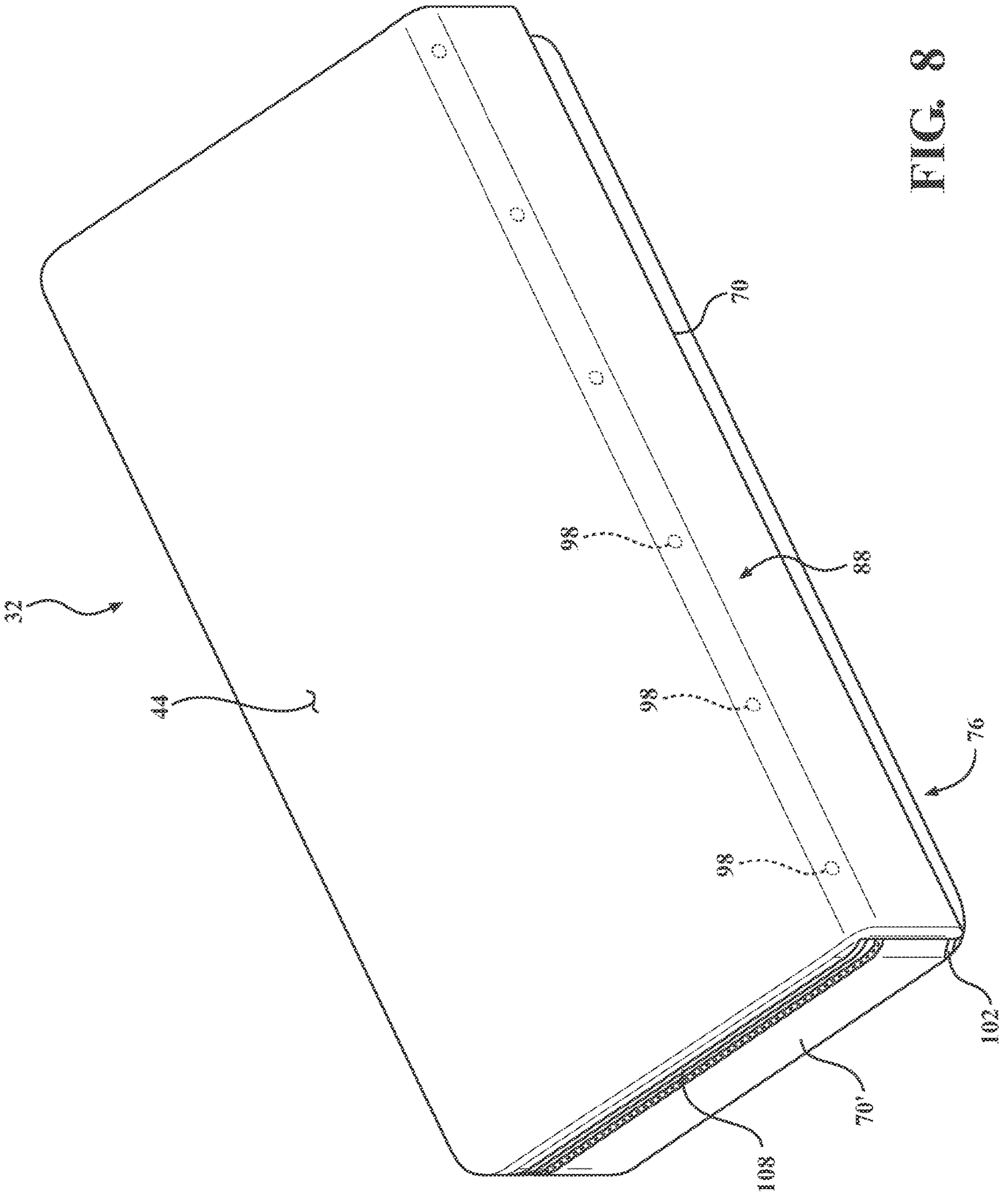
FIG. 8 is a perspective view of the mattress cover of FIG. 2 with an augmenting feature in accordance with another exemplary embodiment of the present disclosure
Figure 9:
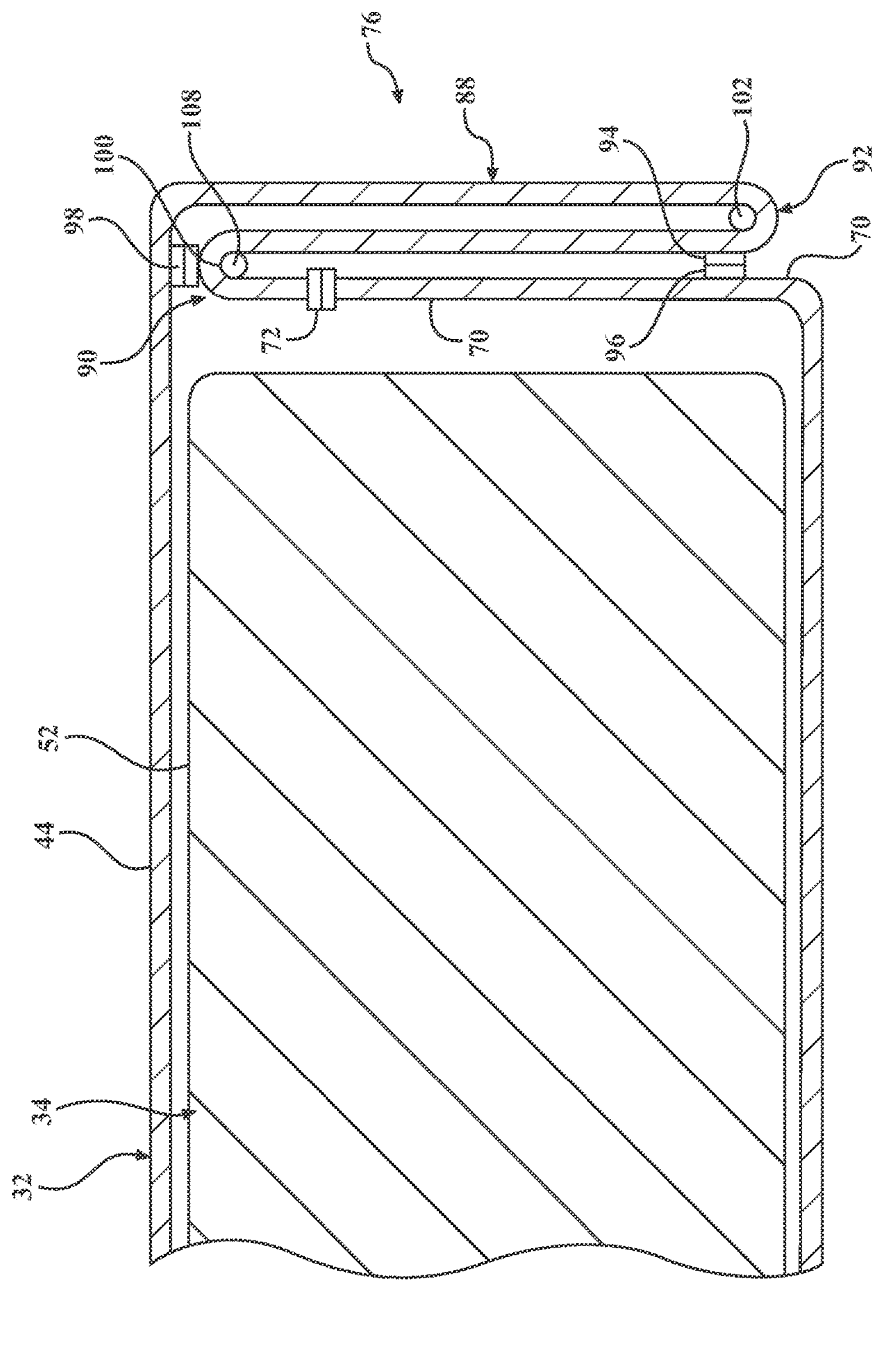
FIG. 9 is a sectional view of the mattress cover and mattress of FIG. 2 taken along section lines 9-9.
Figure 10:
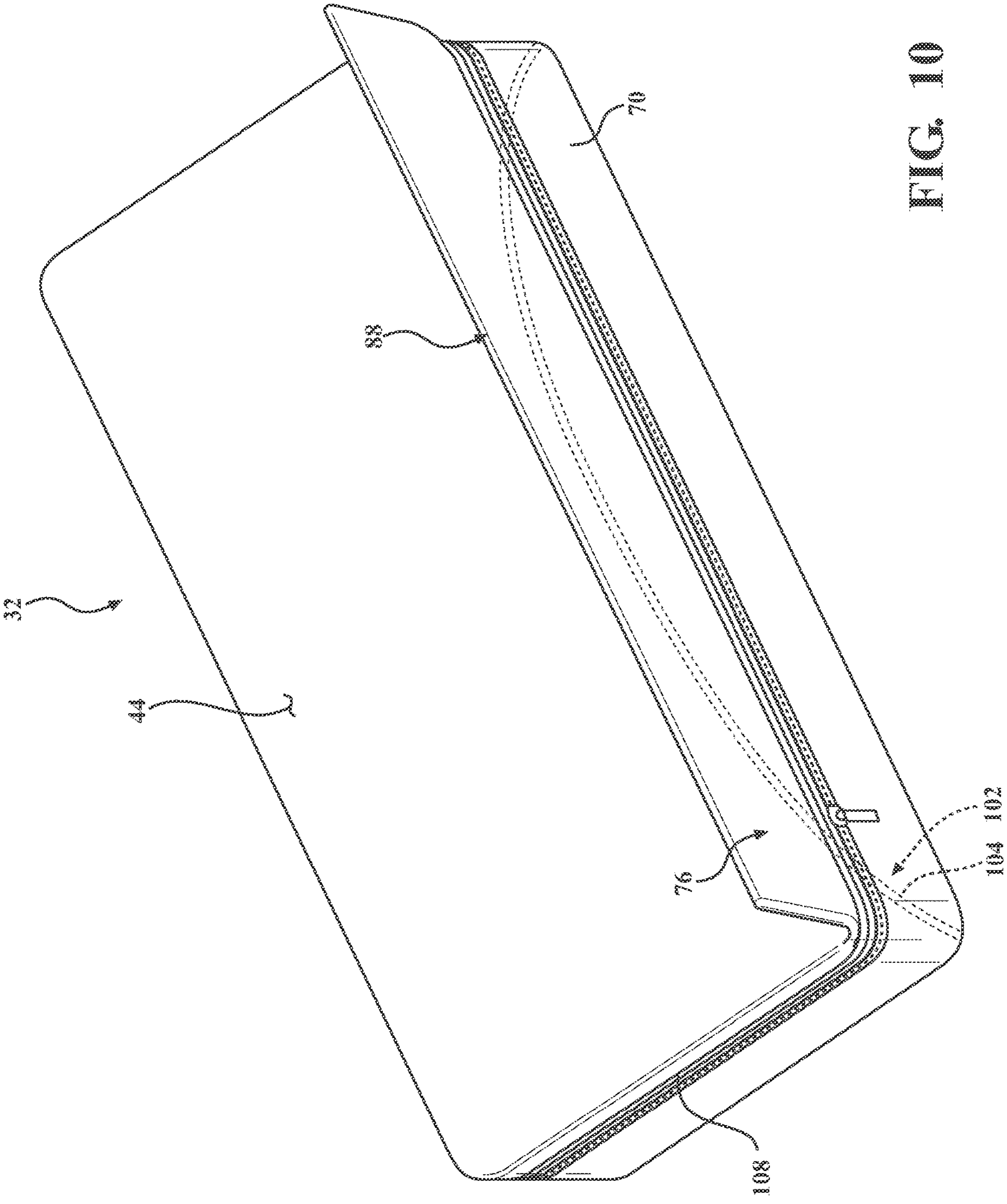
FIG. 10 is a perspective view of the mattress cover of FIG. 2 with an augmenting feature in accordance with another exemplary embodiment of the present disclosure

FIGS. 8 and 9 show the augmenting feature 76 in accordance with another exemplary embodiment of the present disclosure. The augmenting feature 76 includes a fold of material 88 coupled to the peripheral portion 70. The fold of material 88 is adapted to be positioned adjacent the peripheral portion 70 when the augmenting feature 76 is in the stored configuration, as shown in FIGS. 8 and 9. The fold of material is also adapted to extend away from the peripheral portion 70 when the augmenting feature 76 is in the deployed configuration, as shown in FIG. 10.

Referring to FIG. 9, the fold of material 88 includes a coupled end 90 coupled to the peripheral portion 70 near or proximate to the patient support portion 44. In another example, the coupled end 90 may be coupled to the patient support portion 44 near or proximate to the peripheral portion 70. The coupled end 90 may be considered an articulating or pivot point about which the fold of material 88 articulates or pivots as the augmenting feature 76 moves between the stored and deployed configurations. The fold of material 88 includes a free end 92 opposite the coupled end 90. The free end 92 is movable relative to the coupled end 90 as the augmenting feature 76 moves between the stored and deployed configurations. For example, the free end 92 may be adapted to be positioned adjacent the peripheral portion 70 with the augmenting feature 76 in the stored configuration, as shown in FIGS. 8 and 9, and away from the peripheral portion 70 with the augmenting feature 76 in the deployed configuration.

For both function and aesthetics it is generally desirable to maintain the fold of material 88 adjacent the peripheral portion 70 with the augmenting feature 76 in the stored configuration. The present disclosure contemplates doing so in several manners. In one exemplary embodiment, the augmenting feature 76 includes a coupler 94 coupled to either the peripheral portion 70 or the fold of material 88, and a counterposing coupler 96 coupled to the other. The couplers 94, 96 may include snaps, clips, hook and eye connections, adhesive, and the like. In one example shown in FIG. 9, the coupler 94 is a magnet coupled to the fold of material 88, and the counterposing coupler 96 is ferromagnetic material coupled to the peripheral portion 70. Based on well-known principles of magnetism, when the magnet and the ferromagnetic material automatically couple when positioned sufficiently proximate to one another. Thus, the magnet and the ferromagnetic material are adapted to automatically couple with the augmenting feature 76 in the stored configuration, and automatically decouple as the augmenting feature 76 is moved from the stored configuration the deployed configuration. For example, a magnet having low-tension, high-shear magnetic properties may be particularly suitable for the application. During the movement therapy the thickness T of the mattress 34 increases (i.e., the upper surface 52 moves upwardly in the elevational view of FIG. 9), thereby providing a corresponding upward force to the patient support portion 44 of the mattress cover 32. The fold of material 88, initially constrained by the couplers 94, 96, is placed in tension until the forces on the fold of material 88 are sufficient to overcome the forces between the couplers 94, 96, for example, the high-shear magnetism between the magnet and the ferromagnetic material. The couplers 94, 96 automatically decouple, after which the free end 92 of the fold of material 88 articulates about the coupled end 90 as the thickness T of the mattress 34 continues to increase. The fold of material 88 may slidably move upwardly along the peripheral portion 70, and further move above the patient support portion 44 to extend away from the peripheral portion 70, as shown in FIG. 10. As the thickness T of the mattress 34 is decreased, the upper surface 52 of the mattress 34 moves downwardly. The downward movement of the upper surface 52 of the mattress 34 and the patient support portion 44 provides slack to the fold of material 88, which descends or moves downwardly under the influence of gravity. As the augmenting feature 76 nears the stored configuration, the free end 92 may be positioned adjacent the patient support portion 44 such that the couplers 94, 96 are sufficiently proximate to automatically couple, such as under the force of magnetism. The resulting arrangement includes the fold of material 88 of the mattress cover 32 being nestled for the functional and aesthetic benefit of the patient P and the caregivers moving about the patient support apparatus 30.

In certain embodiments, additional couplers 98, 100 are positioned at or near the patient support portion 44. With reference to FIGS. 8 and 9, the coupler 98 may be a magnet coupled to the fold of material 88, and the counterposing coupler 100 is ferromagnetic material coupled to the peripheral portion 70. FIG. 9 shows the coupler 98 positioned near the coupled end 90 of the fold of material 88. When viewed in the perspective view of FIG. 8, the magnets extend along the length of the mattress cover 32. For example, a magnet having low-tension, high-shear magnetic properties may be particularly suitable for the coupler 98 positioned at or near the patient support portion 44 to prevent detachment upon "hammocking" of the patient support portion 44 (i.e., alteration of the patient support portion 44 result in a generally concave or arcuate contour), but provide for easy detachment during the movement therapy. The couplers 98, 100 retain the fold of material 88 adjacent to the peripheral portion 70 until the tensile forces on the couplers 98, 100 is sufficient to decouple the couplers 98, 100, after which the augmenting feature 76 moves towards the deployed configuration in the manner previously described. It is to be understood the couplers 98, 100 at or near the patient support portion 44 may be in addition to the couplers 94, 96 at or near the free end 92 of the fold of material 88.

The augmenting feature 76 of the mattress cover 32 may include a resilient member 102 coupled to the fold of material 88 at or near the free end 92. The resilient member 102 is adapted to bias the fold of material 88 towards the stored configuration. In other words, the resilient member 102 is adapted to bias or urge the free end 92 of the fold of material 88 to the position adjacent the peripheral portion 70. With continued reference to FIGS. 8 and 9, the resilient member 102 may be coupled to the fold of material 88 at or near the free end 92 and to another one of the peripheral portions 70' of the mattress cover 32. As the augmenting feature 76 is moved from the stored configuration to the deployed configuration, the resilient member 102 is tensioned. For example, with the resilient member 102 coupled to the peripheral portion 70' as shown in FIG. 8, the resilient member 102 is elastically tensioned by a force in a direction generally transverse to a direction of the resilient member 102 (e.g. the transverse force is upwardly with the resilient member 102 oriented substantially horizontally). The resilient member 102 continues to urge or bias the fold of material 88 towards the stored configuration against the forced associated with increasing the thickness T of the mattress 34 during the movement therapy. It is understood that the forces associated with increasing the thickness T of the mattress 34 during the movement therapy are sufficient to overcome the biasing forces provided by the resilient member 102.

In another exemplary embodiment, the resilient member 102 is coupled to the fold of material 88 at or near the free end 92 and to the peripheral portion 70 of the mattress cover 32 (to which the fold of material 88 is coupled at the coupled end 90). In many respects similar to the aforementioned exemplary embodiment, the resilient member 102 is adapted to bias the fold of material 88 towards the stored configuration, or to the position adjacent the peripheral portion 70. The resilient member 102 is elastically tensioned by a force, in this example a force in a direction generally axial to a direction of the resilient member 102.

In certain embodiments, the resilient member 102 may be an elastic band. The elastic band may be coupled at one end to the fold of material 88, and at the other end to one of the peripheral portions 70, 70'. The elastic band is elastically tensioned by the forces, axial or transverse, associated with the augmenting feature 76 moving from the stored configuration the deployed configuration in response to increasing the thickness T of the mattress 34 during the movement therapy. As is understood with elasticity generally, the elastic band is biased to return an untensioned state, which includes the fold of material 88 positioned adjacent the peripheral portion 70. In another exemplary embodiment, the resilient member 102 may be an elongate rod 104. Referring to FIG. 10, the elongate rod 104 may be coupled at its ends to the peripheral portion 70 or any suitable structure of the mattress cover 32. The elongate rod 104 is coupled to the fold of material 88 in a manner that permits the augmenting feature 76 to move from the stored configuration the deployed configuration against the biasing force provided by the elongate rod 104. For example, the elongate rod 104 may be arcuate in an untensioned state with a central portion of the elongate rod 104 coupled to the fold of material 88, such as extending through a loop of fabric in the fold of material 88. In manners previously described, as the augmenting feature 76 is moved from the stored configuration to the deployed configuration, the resilient elongate rod 104 is tensioned (e.g., bent) by a force in a direction generally transverse to a direction of the elongate rod 104. The elongate rod 104 continues to bias the fold of material 88 towards the stored configuration against the constraint provided by increasing the thickness T of the mattress 34 during the movement therapy. In some respects, the elongate rod 104 may be considered to function as an inverted leaf spring. In one non-limiting example, the elongate rod 104 may be formed primarily of resilient carbon having the desired flexural properties to achieve the aforementioned function as the augmenting feature 76 moves between the stored and deployed configurations. Other suitable materials forming the elongate rod 104 are contemplated, such as metal, polymer, rubber, and the like.

With continued reference to FIGS. 7-10, the mattress cover 32 may include a securing member 108 for preventing relative movement between the mattress cover 32 and the mattress 34. With the mattress cover 32 substantially encasing the mattress 34, relative movement between the two may be limited; however, it may be advantageous to ensure any relative movement is localized to the augmenting feature 76, which is specifically adapted to move between the stored and deployed configurations. Further, in another exemplary embodiment to be described in which the mattress cover 32 does not substantially encase the mattress 34, it may be particularly advantageous to provide the securing member 108. In certain embodiments, the securing member 108 may extend along one or more of the peripheral portions 70 of the mattress cover 32. The securing member 108 may be disposed between the fold of material 88 and the peripheral portion 70 such that the fold of material 88 is permitted to move relative to the mattress 34, but the peripheral portion 70 is restricted from doing so. In one example, the securing member 108 is positioned between the fold of material 88 and the peripheral portion 70 at, near, or proximate to the coupled end 90 of the fold of material 88, as shown in FIG. 9. In many respects, positioning the securing member 108 at or near the coupled end 90 of the fold of material 88 ensures the free end 92 articulates or pivots about the coupled end 90 as opposed to some other aspect of the fold of material 88.

Suitable materials for the securing member 108 may include an elastic or inelastic cord, band, or wire, among others.

Figure 11:
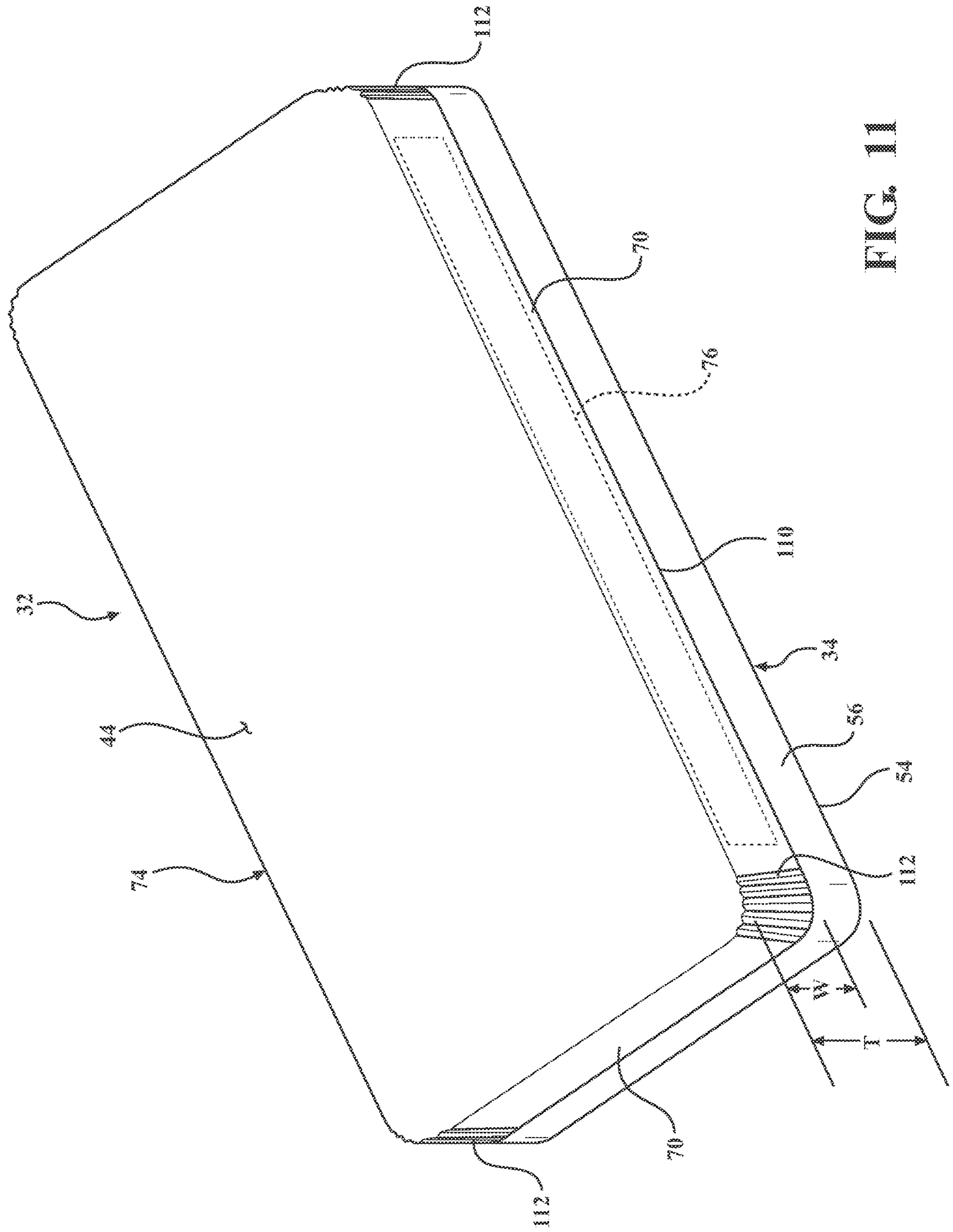
FIG. 11 is a perspective view of a mattress cover and a mattress in accordance with another exemplary embodiment of the present disclosure.

As mentioned above, the mattress cover 32 may not substantially encase the mattress 34. In other words, the mattress cover 32 may lack one or more of the bottom portion 68 and/or the peripheral portions 70 covering the respective surfaces of the mattress 34. One exemplary embodiment of the mattress cover 32 not substantially encasing the mattress 34 is shown in FIG. 11. The patient support portion 44 includes the outer periphery 74 sized so that the majority of the patient P is supported on the patient support portion 44 during the movement therapy. In the present embodiment, the peripheral portions 70 are coupled to and extend from patient support portion 44 with the peripheral portions 70 positioned adjacent to and/or adapted to cover the sides 56 of the mattress 34. The mattress cover 32 does not include the bottom portion 68 (see FIG. 2). Rather, the peripheral portions 70 include a lower edge 110 with the width W of the peripheral portion 70 defined between the patient support portion 44 and the lower edge 110. The lower edge 110 may extend along the peripheral portion 70 between the patient support portion 44 and the lower surface 54 of the mattress 34 such that the width W of the peripheral portion 70 is less than the thickness T of the mattress 34. As a result, a portion of the sides 56 of the mattress 34 may be exposed when the mattress cover 32 is coupled to the mattress 34. In another example, the lower edge 110 extends along the bottom surface 54 of the mattress 34. The peripheral portions 70 of the mattress cover 32 may cover the sides 56 of the mattress 34, but a portion of the bottom surface 54 of the mattress 34 may be exposed. The augmenting feature 76 associated with the peripheral portion 70 is represented schematically and may include any one or more aspects of the exemplary embodiments of the augmenting feature 76 described throughout the present disclosure.

The mattress cover 32 removed from the mattress 34 by slidably moving the lower edge 110 along the sides 56 of the mattress 34 (i.e., the mattress cover 32 of the present embodiment may not include the fastening device 72 (see FIG. 2)). To secure the mattress cover 32 to the mattress 34 during use, the mattress cover 32 includes one or more retaining features 112. In the exemplary embodiment illustrated in FIG. 11, the retaining features 112 include portions of expandable fabric in many respects akin to a fitted sheet of bedding. Other fastening devices may include snaps, clips, hook and eye connections, adhesive, and the like. As mentioned, providing the securing member 108 may be particularly suitable for the present embodiment such that, as the thickness T of the mattress 34 increases during the movement therapy, relative movement of the mattress cover 32 is prevented other than the augmenting feature 76 moving from the stored configuration to the deployed configuration in manners previously described. In other words, the securing member 108 may limit or prevent the lower edge 110 of the mattress cover 32 from slidably moving upwardly along the sides 56 of the mattress 34 as the thickness T of the mattress 34 increases during the movement therapy. Other means for preventing relative movement between the mattress cover 32 and the mattress 34 are within the scope of the present disclosure.

In certain embodiments, the lower edge 110 may be coupled to a mechanical system adapted to permit controlled movement of and provide retraction of the mattress cover 32 relative to the mattress 34 in response to increasing and decreasing of the thickness T of the mattress 34, respectively, during the movement therapy. For example, a spring-loaded roller (not shown) may be provided adjacent to the peripheral portion 70 or within the mattress cover 32 (or the mattress 34). The spring-loaded roller may include a torsion spring biasing the roller to furl the lower edge 110 of the mattress cover 32 about the roller. During the movement therapy, the forces associated with increasing the thickness T of the mattress 34 are sufficient to overcome the biasing forces provided by the torsion spring, and the mattress cover 32 unfurls from the roller providing slack to accommodate the upward movement of the upper surface 52 of the mattress 34. As the upper surface 52 moves downwardly, the biasing forces provided by the torsion spring urge the mattress cover 32 to furl the lower edge 110 of the mattress cover 32 about the roller. In some respects, the spring-loaded roller may be considered another exemplary embodiment of the augmenting feature 76 of the present disclosure.

Figure 12:
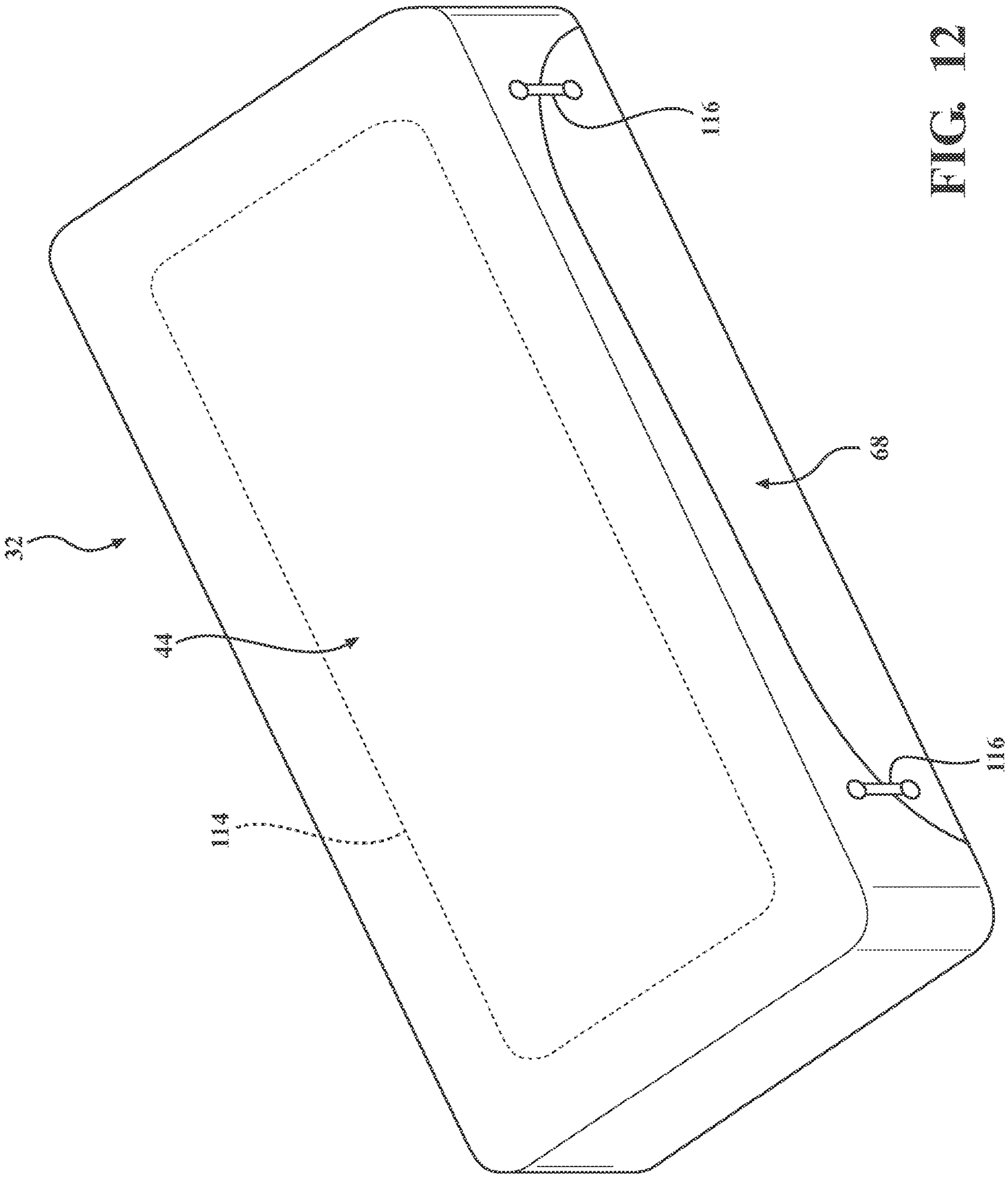
FIG. 12 is a perspective view of a mattress cover and a mattress in accordance with another exemplary embodiment of the present disclosure.
Figure 13:
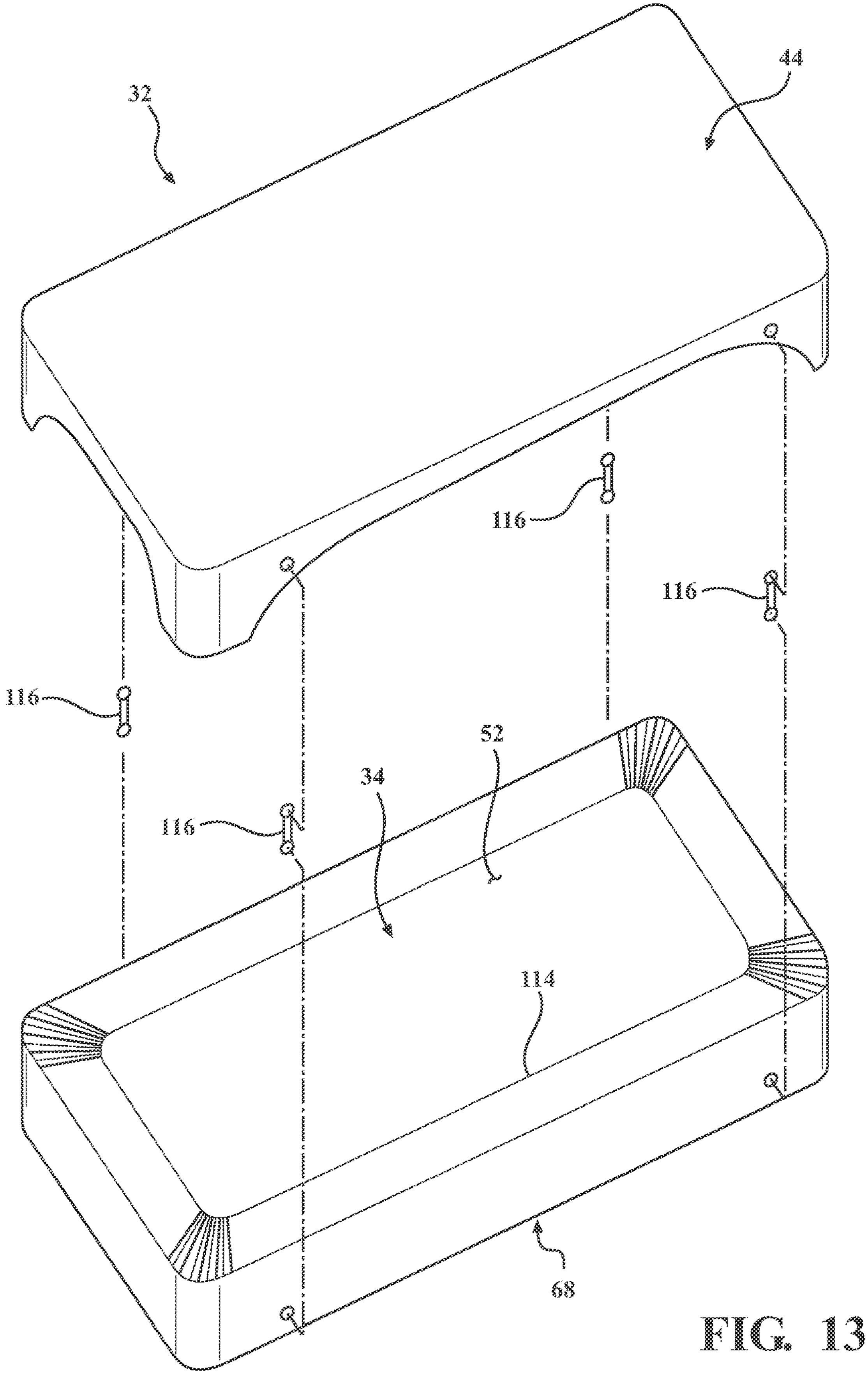
FIG. 13 is a partially exploded view of the mattress cover and the mattress of FIG. 12.

Referring to FIGS. 12 and 13, the mattress cover 32 in accordance with another exemplary embodiment of the present disclosure is shown. The mattress cover 32 includes the patient support portion 44 covering the upper surface 52 of the mattress 34 with the patient support portion 44 having the outer periphery 74 sized so that the majority of the patient P is supported on the patient support portion 44 within the outer periphery 74 during the movement therapy. The mattress cover 32 includes the bottom portion 68 opposite the patient support portion 44 with the bottom portion 68 adapted to cover the lower surface 54 of the mattress 34 such that the mattress 34 is disposed between the patient support portion 44 and the bottom portion 68. As shown in FIG. 12, the patient support portion 44 is adapted to at least partially overlap the bottom portion 68 and move relative to the bottom portion 68 to accommodate the increasing thickness T of the mattress 34 during the movement therapy.

FIG. 13 shows the bottom portion 68, includes an upper edge 114. The bottom portion 68 is coupled to the mattress 34 such that the bottom portion 68 covers the lower surface 54 of the mattress 34 and at least a portion of the sides 56 of the mattress 34. In the exemplary embodiment of FIG. 13, the bottom portion 68 covers the lower surface 52, the sides 56, and a portion of the upper surface 52 of the mattress 34. Thus, it may be considered that the peripheral portions 70 of previously described embodiments may be integrated with the bottom portion 68 of the present embodiment. The bottom portion 68 may include retaining features (see, for example, the retaining features 112 of FIG. 11) adapted to secure the bottom portion 68 to the mattress 34. The retaining features may include portions of expandable fabric in many respects akin to a fitted sheet of bedding, or may include snaps, clips, hook and eye connections, adhesive, and the like.

The patient support portion 44 and the bottom portion 68 may overlap adjacent to opposing sides 56 of the mattress 34, as shown in FIG. 12. Furthermore, the patient support portion 44 substantially or completely overlaps the upper edge 114 of the bottom portion 68 when the patient support portion 44 is placed on the upper surface 52 of the mattress. FIG. 12 shows the upper edge 114 in phantom with the patient support portion 44 completely overlapping the upper edge 114. Based on the overlapping arrangement of the patient support portion 44 and the bottom portion 68, the mattress cover 32 of the present embodiment substantially encases the mattress 34 with the mattress cover 32 accommodating the increase in thickness T of the mattress 34 in a manner to be described. Further, overlapping arrangement of the patient support portion 44 and the bottom portion 68 allows for the mattress cover 32 to be quickly coupled and/or decoupled from the mattress 34. The patient support portion 44 and the bottom portion 68 may be coupled with one or more resilient members 116. The resilient member 116 biases the patient support portion 44 towards the bottom portion 68, and the bottom portion 68 towards the patient support portion 44 with several exemplary embodiments of the resilient member 116 to be described.

An exemplary operation of the mattress cover 32 of the present embodiment will now be described. The patient support portion 44 is coupled to the bottom portion 68 with the resilient members 116 such that the mattress cover 32 substantially encases the mattress 34. The patient support portion 44 and the bottom portion 68 overlap adjacent to opposing sides 56 of the mattress 34. During the movement therapy the thickness T of the mattress 34 increases (i.e., the upper surface 52 moves upwardly in the elevational view of FIG. 5), thereby providing a corresponding upward force to the patient support portion 44 of the mattress cover 32. The patient support portion 44 moves away from the bottom portion 68 against the biasing force provided by the resilient members 116. Conversely, as the thickness T of the mattress 34 decreases, such as during cycling of the movement therapy, the resilient member 116 urges the patient support portion 44 moves towards the bottom portion 68. In many respects the overlapping arrangement of the patient support portion 44 moveable relative to the bottom portion 68 in conjunction with the resilient members 116 may be considered another exemplary embodiment of the augmenting feature 76.

In the exemplary embodiment illustrated in FIGS. 12 and 13, the resilient member 116 is an elastic band or tether coupled to each of the patient support portion 44 and the bottom portion 68, such as with a loop on pegs or a hook through eyelets. In certain embodiments, the resilient member 116 is an elastic strap coupled to the patient support portion 44 that wraps around the bottom portion 68. The elastic strap may be positioned at or near a head end 118 or a foot end 120 of the mattress cover 32 (see FIG. 15). In certain embodiments, the resilient member 116 is a semi-rigid elongate rod acting as a leaf spring biasing the patient support portion 44 towards the bottom portion 68, and the bottom portion 68 towards the patient support portion 44. More than one of the aforementioned exemplary embodiments of the resilient member 116 may be used with variation in attachment points to be considered contemplated by the present disclosure.

Figure 14:
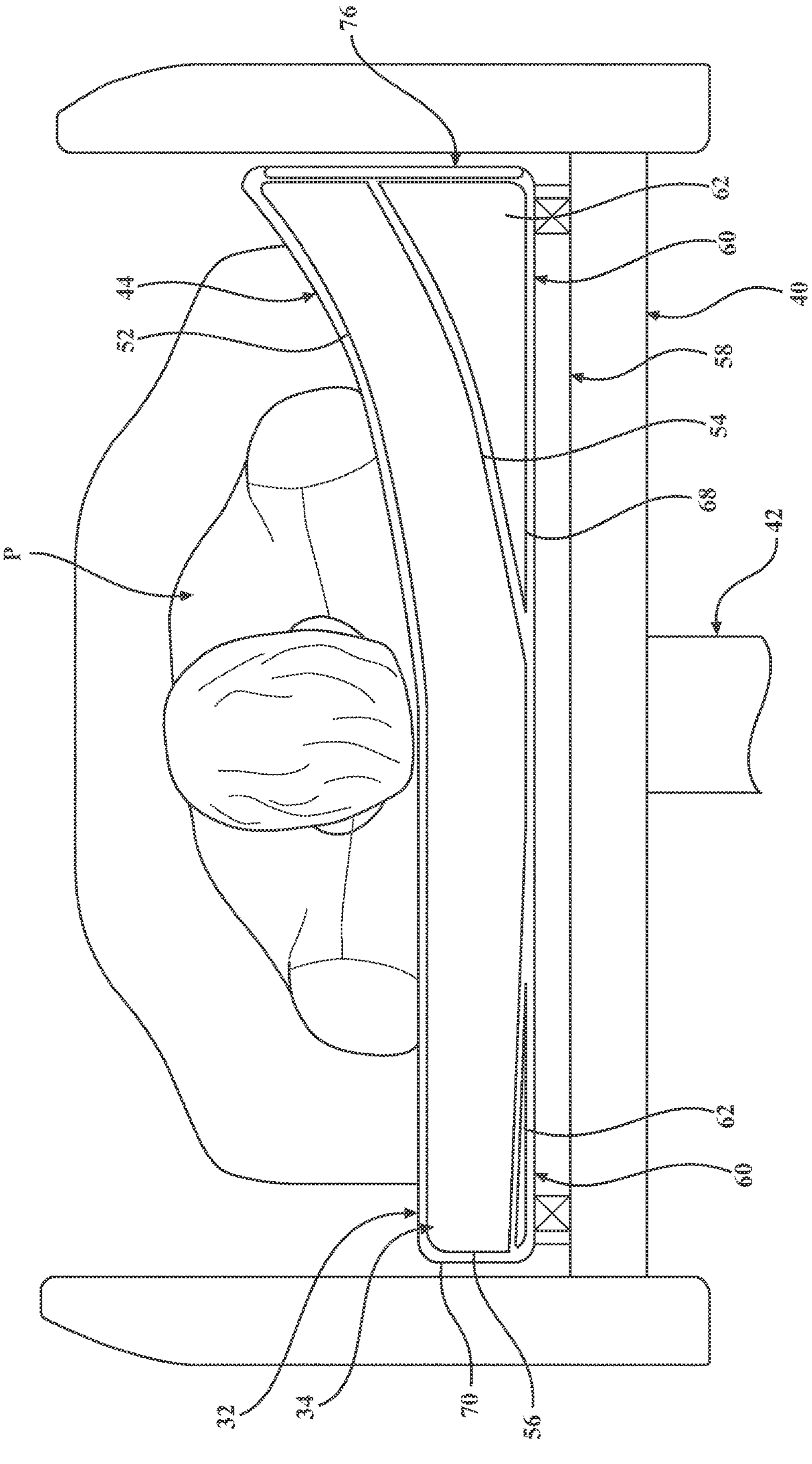
FIG. 14 is an elevation view of a portion of the patient support apparatus of FIG. 1 with a patient turning device external to the mattress providing movement therapy to the patient and with the augmenting feature represented schematically in the deployed configuration.

In exemplary embodiments of the present disclosure discussed to this point, providing the movement therapy included increasing the thickness T of the mattress 34 with the patient P disposed thereon. For example, FIGS. 3, 4A and 4B shows the patient turning device 60 within the mattress 34 with the patient turning device 60 including one or more inflatable bladders 62 adapted to receive fluid from the fluid source to increase the thickness T of the mattress 34 during the movement therapy. In another exemplary embodiment shown in FIG. 14, a movement therapy mattress assembly includes the mattress 34 having the upper surface 52, the lower surface 54, the sides 56, and the patient turning device 60. The patient turning device 60 shown in FIG. 14 is positioned adjacent to the lower surface 54 of the mattress 34. In certain embodiments, the patient turning device 60 includes the inflatable bladder(s) 62 positioned adjacent to the lower surface 54 of the mattress 34. In other words, the patient turning device 60 is external to the mattress 34. Alternative embodiments of the patient turning device 60 may include an articulable mechanism within or external to the mattress 34 with the articulable mechanism adapted to change the shape of the mattress 34 without increasing its volume.

The patient turning device 60 is adapted to move at least a portion of the mattress 34 to provide the movement therapy. The patient turning device 60 may be actuated by, for example, the inflatable bladder(s) 62 being selectively inflated with fluid from the fluid source (not shown). FIG. 14 shows the inflatable bladder 62 associated with the right side of the mattress 34 at least partially inflated, and another one of the inflatable bladders 62 associated with the left side in an uninflated state. Expansion of the inflatable bladder(s) 62 moves the mattress 34 and the mattress cover 32 covering at least a portion of the mattress 34. The upper surface 52 of the mattress 34 is moved upwardly with the movement corresponding to the expansion of the inflatable bladder(s) 62 to define the movement therapy. Conversely, the inflatable bladder(s) 62 may be selectively deflated, such as by an actuated valve and/or under the influence of a vacuum to permit the mattress 34 to move downwardly under its own weight. Once the inflatable bladder(s) 62 of the patient turning device 60 has returned to being uninflated, the mattress cover 32 and the mattress 34 may be considered in the absence of movement therapy. It is understood that during the movement therapy the thickness T of the mattress 34 may not be substantially alerted in the present embodiment.

The patient turning device 60, while external to the mattress 34, may be covered by or disposed within the mattress cover 32. The mattress cover 32 includes the patient support portion 44 covering the upper surface 52 of the mattress 34, the bottom portion 68 coupled to the patient support portion 44, and the peripheral portions 70 extending between the patient support portion 44 and the bottom portion 68. The patient support portion 44 includes the outer periphery 74 sized so that the majority of the patient P is supported on the patient support portion 44 within the outer periphery 74 during the movement therapy. The peripheral portions 70 cover the sides 56 of the mattress 34.

The bottom portion 68 (and in certain embodiments the peripheral portion 70) covers the inflatable bladder(s) 62 of the patient turning device 60. In the exemplary embodiment illustrated in FIG. 14, the inflatable bladder 62 is generally triangular when expanded with a first side adjacent the lower surface 54 of the mattress 34, a second side adjacent the bottom portion 68 of the mattress cover 32, and a third side adjacent one of the peripheral portions 70. The inflatable bladder 62 may be temporarily or permanently coupled to the lower surface 54 of the mattress 34, such as with fasteners, sewing, radiofrequency or ultrasonic welding, and other joining means. It is contemplated that the inflatable bladder 62 may be in fluid communication with a fluid reservoir within the mattress 34, such as with ports disposed on the lower surface 54 of the mattress 34 and the first side of the inflatable bladder 62 adjacent the lower surface 54.

The aforementioned arrangement is such that the patient turning device 60, and in certain embodiments the mattress 34, is substantially encased within the mattress cover 32. Thus, when the patient turning device 60 and the mattress 34 is substantially encased within the mattress cover 32, it is understood that mattress cover 32 must expand or otherwise provide slack to prevent the mattress cover 32 from moving in response to expansion of the inflatable bladders 62 during the movement therapy. The mattress cover 32 includes the augmenting feature 76 associated with one of the peripheral portions 70. The augmenting feature 76 is adapted to move between the stored configuration in the absence of the movement therapy, and the deployed configuration to accommodate the movement of the mattress 34 during the movement therapy in manners previously described. The augmenting feature 76 is represented schematically in FIG. 14, and it is understood that the augmenting feature 76 may include any one or more aspects of the exemplary embodiments of the augmenting feature 76 described throughout the present disclosure.

Figure 15:
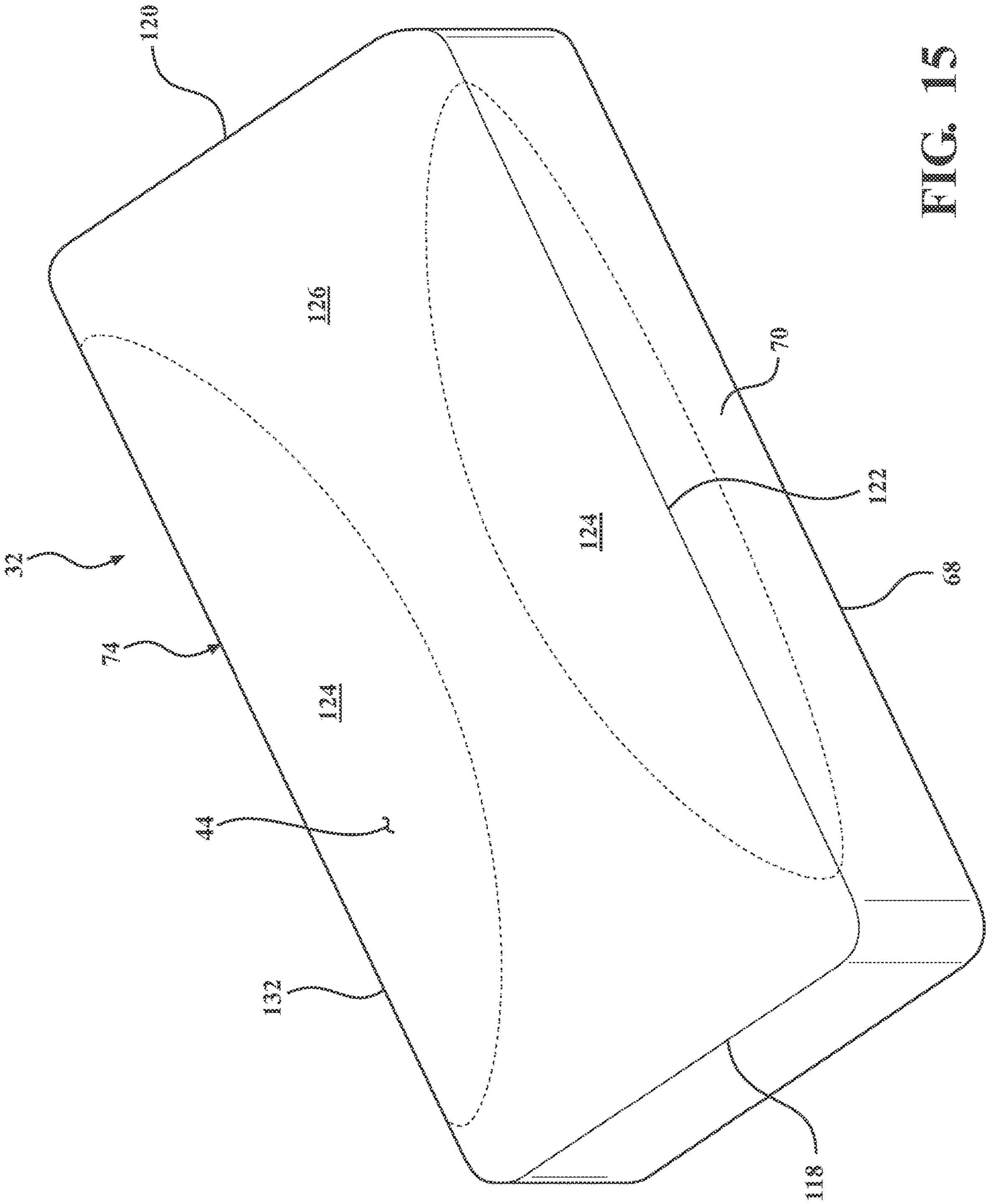
FIG. 15 is a perspective view of a mattress cover in accordance with another exemplary embodiment of the present disclosure.

Referring to FIG. 15, the mattress cover 32 in accordance with another exemplary embodiment of the present disclosure is shown. The mattress cover 32 is formed from materials having different elasticity to concentrate elastic expansion during the movement therapy in a manner to be described. The mattress cover 32 includes the patient support portion 44 with the outer periphery 74 defined by the head end 118, the foot end 120, and opposing sides 122 of the patient support portion, as shown in FIG. 15. The mattress cover 32 includes the bottom portion 68 coupled to the patient support portion 44 and adapted to cover the lower surface 54 of the mattress such that the mattress cover 32 substantially encases the mattress 34 between the patient support portion 44 and the bottom portion 68.

The patient support portion 44 may be include a first area 124 formed from a first material having a first elasticity, and a second area 126 formed of a second material having a second elasticity. For example, FIG. 15 shows a pair of the first areas 124 each positioned adjacent to one of the opposing sides 122 of the patient support portion 44. The second area 126 is positioned inwardly from the outer periphery 74 relative to the first area 124. In certain embodiments, the second elasticity is less than the first elasticity such that, during the movement therapy, elastic expansion is concentrated to the first area 124. The second area 126 may be positioned adjacent the head end 118 and the foot end 120 such that the second area 126 expands in response to increasing the thickness T of the mattress 34 to a lesser extent than the first area 124. In other words, the mattress cover 32 includes discrete zones within the patient support portion 44 to localize expansion. The discrete zones may be within a single layer of the mattress cover 32. It is understood that while two areas 124, 126 are described, any number and/or location of areas may be provided having one or more respective elasticities to impart the desired expansive and other properties to the mattress cover 32. For example, as shown in FIG. 15, portions of the first area 124 extend to the peripheral portions 70.

As mentioned, the first area 124 is formed of the first material with higher relative elasticity than the second material, and the first area 124 is positioned adjacent to the opposing sides 122 of the patient support portion 44. With concurrent reference to, for example, FIGS. 4B and 14, the patient turning device 60 increases the thickness T of the mattress 34 (or moves the mattress 34) with greater magnitude near the sides 56 of the mattress 34. The first area 124 compensates, expands, or otherwise provides slack to prevent the mattress cover 32 from impeding increasing the thickness T of the mattress 34 or movement of the mattress 34 during the movement therapy. In some respects, the first area 124 having greater relative elasticity than the second area 126 may be considered another exemplary embodiment of the augmenting feature 76. It is to be understood that the mattress cover 32 having areas 124, 126 of different relative elasticities may be used in conjunction with any one or more aspects of the other exemplary embodiments of the augmenting feature 76 described throughout the present disclosure.

In certain embodiments, the first material has high breathability. One material having suitable breathability is Gore-Tex™ fabric manufactured by W. L. Gore & Associates, Inc. (Newark, Dela.). A moisture resistant layer may also be laminated with the mattress cover 32 to form a membrane, or alternatively the first area 124 may be thermally treated to modify the physical properties of the first material. In certain embodiments, the second area 126 has high elasticity. One material having suitable elasticity is Lycra® fabric, a registered trademark of Invista Inc. (Wichita, Kans.).

The first area 124 and/or the second area 126 may be fabricated from layers that are separately extruded then assembled by adhesion or thermal fusion. In another example, the layers are knit from yarns having different fiber properties such as fiber weight. The fibers may be arranged in three-dimensional layers to vary density, direction, and/or tension (e.g., anisotropic fibers). The fibers may be coated to further impart desired physical properties. In other examples, the fabrics may be laminated by spraying a screen print with materials having selected properties. It is further contemplated that advanced manufacturing techniques, such as three-dimensional printing, may also be implemented to tailor the location and orientation of the elastic expansion of the first material and/or the second material within the first area 124 and/or the second area 126, respectively. Additive manufacturing techniques may provide for control of local surface shear and microclimate properties of one or more of the layers of the mattress cover 32 and/or the mattress 34 (see, for example, FIG. 3).

The present disclosure contemplates that the advantageous features of the mattress cover 32 described throughout the present disclosure may be provided on a mattress overlay with the bottom portion 68 of the mattress overlay adapted to be positioned on and conformable to the upper surface 52 of the mattress 34. The mattress overlay, including the mattress cover 32, includes a cushioning layer (e.g., the mattress core layer 66 of FIG. 3), and a patient turning device 60. The cushioning layer and the patient turning device 60 are disposed intermediate or between the patient support portion 44 and the bottom portion 68 positioned on the upper surface 52 of the mattress 34. In other words, the cushioning layer and the patient turning device 60 may be considered substantially encased within the mattress cover 32 of the mattress overlay. The mattress overlay includes the augmenting feature 76 adapted to move between the stored configuration in the absence of movement therapy, and the deployed configuration in response to increasing the thickness of the mattress overlay positioned atop the mattress 34.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention is intended to be defined in the independent claims, with specific features laid out in the dependent claims, wherein the subject-matter of a claim dependent from one independent claim can also be implemented in connection with another independent claim.

What is claimed is:

1. A mattress cover for coupling to a mattress having an upper surface, a lower surface, sides, and an inflatable bladder for adjusting a size of the mattress for supporting a patient, the mattress cover comprising:

a patient support portion configured to cover the upper surface of the mattress;

a bottom portion coupled to the patient support portion and configured to cover the lower surface of the mattress;

peripheral portions extending between the patient support portion and the bottom portion such that the mattress cover is configured to substantially encase the mattress; and an augmenting feature associated with one of the peripheral portions and being configured to move between a stored configuration in the absence of expansion of the inflatable bladder, and a deployed configuration having an expanded size in response to expansion of the inflatable bladder, the augmenting feature including a resilient member configured to bias the augmenting feature toward the stored configuration.

2. The mattress cover of claim 1, wherein one of the peripheral portions comprises a width defined between the patient support portion and the bottom portion with the width configured to increase as the augmenting feature moves from the stored configuration to the deployed configuration, and decrease as the augmenting feature moves from the deployed configuration to the stored configuration.

3. The mattress cover of claim 1, wherein the augmenting feature further includes concertinaed material coupled to the one peripheral portion with the concertinaed material configured to assume an expanded state in the deployed configuration and a natural state in the stored configuration.

4. The mattress cover of claim 1, wherein the augmenting feature further includes at least one coupler configured to constrain the augmenting feature when the augmenting feature is in the stored configuration.

5. The mattress cover of claim 4, wherein the augmenting feature further includes a fold of material coupled to the one peripheral portion with the fold of material configured to be positioned adjacent the one peripheral portion in the stored configuration and further configured to extend away from the one peripheral portion in the deployed configuration.

6. The mattress cover of claim 5, further comprising a securing member disposed between the fold of material and the one peripheral portion with the securing member configured to prevent relative movement between the mattress cover and the mattress.

7. The mattress cover of claim 5, wherein the fold of material further includes a coupled end coupled to the one peripheral portion proximate the patient support portion and a free end positioned adjacent the one peripheral portion in the stored configuration.

8. The mattress cover of claim 7, wherein the resilient member is coupled to the fold of material at the free end with the resilient member biasing the fold of material to the stored configuration.

9. The mattress cover of claim 7, wherein the resilient member is coupled to another one of the peripheral portions such that the resilient member is configured to be tensioned by a force transverse to the resilient member when the augmenting feature is moved to the deployed configuration.

10. The mattress cover of claim 7, wherein the at least one coupler includes:

a coupler operatively attached to the one peripheral portion, and a counterposing coupler operatively attached to the fold of material with the coupler and the counterposing coupler being releasably coupled to one another.

11. The mattress cover of claim 1, wherein the augmenting feature further includes:

a roller configured to pivot about an axis with one of the peripheral portions at least partially furled about the roller; and a biasing member coupled to the roller and configured to bias the roller against unfurling of one of the peripheral portions as the augmenting feature moves from the stored configuration to the deployed configuration.

12. The mattress cover of claim 1, wherein the inflatable bladder of the mattress is arranged for providing movement therapy to adjust the size of the mattress comprising increasing a thickness of the mattress with the patient disposed thereon;

wherein the patient support portion has an outer periphery sized so that a majority of the patient is supported on the patient support portion within the outer periphery during the movement therapy; and wherein the augmenting feature moves from the stored configuration in the absence of the movement therapy to the deployed configuration having an expanded thickness in response to increasing the thickness of the mattress during the movement therapy.

13. The mattress cover of claim 12, wherein the patient support portion further includes a first area and a second area different from the first area with the first area formed from a first material having greater relative elasticity than a second material forming the second area.

14. The mattress cover of claim 13, wherein the first area is positioned proximate the outer periphery of the patient support portion and the second area is positioned inwardly from the outer periphery relative to the first area such that the patient support portion is configured to concentrate elastic expansion to the first area in response to expansion of the inflatable bladder.

15. The mattress cover of claim 13, wherein the first and second materials are formed in the first and second areas using at least one of additive manufacturing and three-dimensional printing technology.

16. A mattress cover for coupling to a mattress having an upper surface, a lower surface, sides, and an inflatable bladder for adjusting a size of the mattress for supporting a patient, the mattress cover comprising:

a patient support portion configured to cover the upper surface of the mattress;

a bottom portion opposite the patient support portion and configured to cover the lower surface of the mattress such that the mattress is disposed between the patient support portion and the bottom portion; and an augmenting feature configured to move between a stored configuration in the absence of expansion of the inflatable bladder, and a deployed configuration having an expanded size in response to expansion of the inflatable bladder, the augmenting feature including a resilient member configured to bias the augmenting feature toward the stored configuration;

wherein the patient support portion is configured to at least partially overlap the bottom portion and move relative to the bottom portion to accommodate increasing the size of the mattress in response to expansion of the inflatable bladder such that the overlap decreases with increasing size of the mattress.

17. The mattress cover of claim 16, wherein the bottom portion includes an upper edge and the patient support portion completely overlaps the upper edge when placed on the upper surface of the mattress; and wherein the patient support portion and the bottom portion are configured to overlap adjacent to opposing sides of the mattress.

18. The mattress cover of claim 16, wherein the resilient member is coupled to the patient support portion and the bottom portion with the resilient member biasing the patient support portion towards the bottom portion and the bottom portion towards the patient support portion.

19. The mattress cover of claim 16, wherein the inflatable bladder of the mattress is arranged for providing movement therapy to adjust the size of the mattress comprising increasing a thickness of the mattress with the patient disposed thereon;

wherein the patient support portion has an outer periphery sized so that a majority of the patient is supported on the patient support portion within the outer periphery during the movement therapy; and wherein the augmenting feature moves from the stored configuration in the absence of the movement therapy to the deployed configuration having an expanded thickness in response to increasing the thickness of the mattress during the movement therapy.

20. A mattress assembly comprising:

a mattress having an upper surface, a lower surface, sides, and an inflatable bladder configured to adjust a size of the mattress for supporting a patient, the mattress cover comprising; and a mattress cover comprising:

a patient support portion covering the upper surface of the mattress, a bottom portion coupled to the patient support portion, peripheral portions extending between the patient support portion and the bottom portion, the peripheral portions covering the sides of the mattress, and an augmenting feature to move between a stored configuration in the absence of expansion of the inflatable bladder, and a deployed configuration having an expanded size in response to expansion of the inflatable bladder, the augmenting feature including a resilient member configured to bias the augmenting feature toward the stored configuration.

21. The mattress assembly of claim 20, wherein the augmenting feature further includes a roller configured to pivot about an axis with one of the peripheral portions at least partially furled about the roller, and a biasing member coupled to the roller and configured to bias the roller against unfurling of the one peripheral portions as the augmenting feature moves from the stored configuration to the deployed configuration.

22. The mattress assembly of claim 20, wherein the inflatable bladder of the mattress is configured to provide movement therapy to adjust the size of the mattress comprising increasing a thickness of the mattress with the patient disposed thereon;

wherein the patient support portion of the mattress cover has an outer periphery sized so that a majority of the patient is supported on the patient support portion within the outer periphery during the movement therapy; and wherein the augmenting feature of the mattress cover moves from the stored configuration in the absence of the movement therapy to the deployed configuration having an expanded thickness in response to increasing the thickness of the mattress during the movement therapy.

* * * * *